(12) United States Patent
Verner et al.

(10) Patent No.: US 12,245,538 B2
(45) Date of Patent: Mar. 11, 2025

(54) APPARATUS FOR FEEDING A TRANSPLANTER AND A METHOD FOR FEEDING A TRANSPLANTER

(71) Applicant: EQUIPEMENTS VEGTECH, Sherrinton (CA)

(72) Inventors: Guillaume Verner, Sherrington (CA); Daniel Gagnon, Sherbrooke (CA)

(73) Assignee: EQUIPEMENTS VEGTECH, Sherrington (CA)

(*) Notice: Subject to any disclaimer, the term of this patent is extended or adjusted under 35 U.S.C. 154(b) by 731 days.

(21) Appl. No.: 17/501,254

(22) Filed: Oct. 14, 2021

(65) Prior Publication Data

US 2022/0279707 A1    Sep. 8, 2022

Related U.S. Application Data

(60) Provisional application No. 63/156,038, filed on Mar. 3, 2021.

(51) Int. Cl.
*A01C 11/02*    (2006.01)
*A01C 11/00*    (2006.01)

(52) U.S. Cl.
CPC .......... *A01C 11/025* (2013.01); *A01C 11/006* (2013.01)

(58) Field of Classification Search
CPC ............................ A01C 11/025; A01C 11/006
See application file for complete search history.

(56) References Cited

U.S. PATENT DOCUMENTS

| | | | |
|---|---|---|---|
| 4,440,101 | A | 4/1984 | Edwards et al. |
| 4,481,893 | A | 11/1984 | Qvarnstrom |
| 5,215,550 | A | 6/1993 | Tesch, Jr. et al. |

(Continued)

FOREIGN PATENT DOCUMENTS

| | | | |
|---|---|---|---|
| BR | 102016026185 A2 | 6/2018 | |
| CA | 1292392 | 11/1991 | |

(Continued)

OTHER PUBLICATIONS

English abstract of CN1079803025 retrieved from Espacenet on Dec. 14, 2021.

(Continued)

*Primary Examiner* — Jamie L McGowan
(74) *Attorney, Agent, or Firm* — BCF LLP

(57) ABSTRACT

An apparatus having a support frame supports a tray actuation means, a pick up means and a conveyor assembly for feeding a transplanter with viable plants from a multi-celled tray. The tray actuation means is configured to move the multi-celled tray along the support frame. The pick up means is configured to pick up the viable plants by their foliage from the multi-celled tray and leaving non-viable plants therein. The conveyor assembly includes receptacles for receiving one viable plant from the pick up means, and at least one sensor for detecting empty receptacles. A controller cooperatively operates the tray actuation means, the pick up means, and the conveyor assembly in order to skip empty receptacles for ensuring continuous feeding of the transplanter with viable plants. A gripper for picking up plants by their foliage. A method for continuously feeding the transplanter with viable plants.

7 Claims, 25 Drawing Sheets

(56) References Cited

U.S. PATENT DOCUMENTS

| | | | |
|---|---|---|---|
| 5,320,649 A | 6/1994 | Holland | |
| 5,911,631 A | 6/1999 | Bouldin et al. | |
| 5,954,002 A | 9/1999 | Ferrand | |
| 6,080,951 A * | 6/2000 | Thijssen | A01C 11/025 111/104 |
| 6,327,986 B1 * | 12/2001 | Williames | A01C 11/025 111/105 |
| 7,018,163 B2 | 3/2006 | Beavers et al. | |
| 7,051,475 B1 | 5/2006 | Sena | |
| 2002/0043195 A1 * | 4/2002 | Williames | A01C 11/025 111/105 |
| 2006/0260522 A1 | 11/2006 | Fountain et al. | |
| 2009/0031935 A1 * | 2/2009 | Faulring | A01G 9/0299 111/104 |
| 2010/0170426 A1 * | 7/2010 | Faulring | A01G 9/0299 111/105 |
| 2011/0179982 A1 * | 7/2011 | Faulring | A01G 9/0299 111/105 |
| 2015/0264858 A1 | 9/2015 | Chan et al. | |
| 2019/0045706 A1 * | 2/2019 | Kafri | A01C 11/025 |

FOREIGN PATENT DOCUMENTS

| | | | |
|---|---|---|---|
| CA | 2638147 A1 | 2/2009 | |
| CN | 105766174 A | 7/2006 | |
| CN | 104429705 A | 3/2015 | |
| CN | 105379484 A | 3/2016 | |
| CN | 105409407 A | 3/2016 | |
| CN | 105723896 A | 7/2016 | |
| CN | 106258124 A | 1/2017 | |
| CN | 106385897 A | 2/2017 | |
| CN | 106538122 A | 3/2017 | |
| CN | 106688401 A | 5/2017 | |
| CN | 106856757 A | 6/2017 | |
| CN | 106973602 A | 7/2017 | |
| CN | 107117444 A | 9/2017 | |
| CN | 107241948 A | 10/2017 | |
| CN | 107295843 A | 10/2017 | |
| CN | 107306554 A | 11/2017 | |
| CN | 107371878 A | 11/2017 | |
| CN | 107690906 A | 2/2018 | |
| CN | 107820804 A | 3/2018 | |
| CN | 107836179 A | 3/2018 | |
| CN | 107926234 A | 4/2018 | |
| CN | 107980302 A | 5/2018 | |
| CN | 108029300 A | 5/2018 | |
| CN | 108476686 A | 9/2018 | |
| CN | 108633412 A | 10/2018 | |
| CN | 108738557 A | 11/2018 | |
| CN | 108781667 A | 11/2018 | |
| CN | 109005811 A | 12/2018 | |
| CN | 109479470 A | 3/2019 | |
| CN | 110036732 A | 7/2019 | |
| CN | 110291875 A | 10/2019 | |
| CN | 110447361 A | 11/2019 | |
| CN | 110495286 A | 11/2019 | |
| CN | 110521361 A | 12/2019 | |
| CN | 110741789 A | 2/2020 | |
| CN | 111213467 A | 6/2020 | |
| CN | 111247917 A | 6/2020 | |
| CN | 111296012 A | 6/2020 | |
| CN | 111328512 A | 6/2020 | |
| CN | 111436262 A | 7/2020 | |
| CN | 111466190 A | 7/2020 | |
| CN | 111527844 A | 8/2020 | |
| DE | 3942599 A1 | 6/1991 | |
| DE | 60201756 T2 | 12/2005 | |
| EP | 0612466 A1 | 8/1994 | |
| EP | 2022323 A2 * | 2/2009 | A01C 11/025 |
| EP | 2223585 A1 * | 9/2010 | A01C 11/025 |
| FR | 2599211 A2 | 12/1987 | |
| FR | 2702927 A1 | 9/1994 | |
| GB | 2064933 A | 6/1981 | |
| NL | 1021358 C2 | 3/2003 | |
| NL | 1020550 C2 | 11/2003 | |
| WO | 92/05684 A1 | 4/1992 | |
| WO | WO-9403040 A1 * | 2/1994 | A01C 11/025 |
| WO | WO-2005013670 A1 * | 2/2005 | A01C 11/025 |
| WO | 2006068518 A1 | 6/2006 | |
| WO | 2012117008 A1 | 9/2012 | |

OTHER PUBLICATIONS

English abstract of CN108029300 retrieved from Espacenet on Dec. 14, 2021.
English abstract of CN108476686 retrieved from Espacenet on Dec. 14, 2021.
English abstract of CN108633412 retrieved from Espacenet on Dec. 14, 2021.
English abstract of CN108738557 retrieved from Espacenet on Dec. 14, 2021.
English abstract of CN108781667 retrieved from Espacenet on Dec. 14, 2021.
English abstract of CN109005811 retrieved from Espacenet on Dec. 14, 2021.
English abstract of CN109479470 retrieved from Espacenet on Dec. 14, 2021.
English abstract of CN110036732 retrieved from Espacenet on Dec. 14, 2021.
English abstract of CN110291875 retrieved from Espacenet on Dec. 14, 2021.
English abstract of CN110447361 retrieved from Espacenet on Dec. 14, 2021.
English abstract of CN110495286 retrieved from Espacenet on Dec. 14, 2021.
English abstract of CN110521361 retrieved from Espacenet on Dec. 14, 2021.
English abstract of CN110741789 retrieved from Espacenet on Dec. 14, 2021.
English abstract of CN111213467 retrieved from Espacenet on Dec. 14, 2021.
English abstract of CN111247917 retrieved from Espacenet on Dec. 14, 2021.
English abstract of CN111296012 retrieved from Espacenet on Dec. 14, 2021.
English abstract of CN111328512 retrieved from Espacenet on Dec. 14, 2021.
English abstract of CN111436262 retrieved from Espacenet on Dec. 14, 2021.
English abstract of CN111466190 retrieved from Espacenet on Dec. 14, 2021.
English abstract of CN111527844 retrieved from Espacenet on Dec. 14, 2021.
English abstract of EP0612466 retrieved from Espacenet on Dec. 13, 2021.
English abstract of DE3942599 retrieved from Espacenet on Dec. 13, 2021.
English abstract of DE60201756 retrieved from Espacenet on Dec. 13, 2021.
English abstract of FR2599211 retrieved from Espacenet on Dec. 13, 2021.
English abstract of FR2702927 retrieved from Espacenet on Dec. 13, 2021.
English abstract of NL1020550 retrieved from Espacenet on Dec. 13, 2021.
English abstract of NL1021358 retrieved from Espacenet on Dec. 13, 2021.
Futura automated Transplanter, Coztruzioni Meccaniche Ferrari. retrieved from https://ferraricostruzioni.com/en/tray-transplanters/8-futura-automated-transplanter.html.
English abstract of BR102016026185 retrieved from Espacenet on Dec. 13, 2021.
English abstract of CN104429705 retrieved from Espacenet on Dec. 13, 2021.
English abstract of CN105379484 retrieved from Espacenet on Dec. 13, 2021.

(56) References Cited

OTHER PUBLICATIONS

English abstract of CN105409407 retrieved from Espacenet on Dec. 13, 2021.
English abstract of CN105723896 retrieved from Espacenet on Dec. 13, 2021.
English abstract of CN105766174 retrieved from Espacenet on Dec. 13, 2021.
English abstract of CN106258124 retrieved from Espacenet on Dec. 13, 2021.
English abstract of CN106385897 retrieved from Espacenet on Dec. 13, 2021.
English abstract of CN106538122 retrieved from Espacenet on Dec. 13, 2021.
English abstract of CN106688401 retrieved from Espacenet on Dec. 13, 2021.
English abstract of CN106856757 retrieved from Espacenet on Dec. 13, 2021.
English abstract of CN106973602 retrieved from Espacenet on Dec. 13, 2021.
English abstract of CN107117444 retrieved from Espacenet on Dec. 13, 2021.
English abstract of CN107241948 retrieved from Espacenet on Dec. 13, 2021.
English abstract of CN107295843 retrieved from Espacenet on Dec. 13, 2021.
English abstract of CN107306554 retrieved from Espacenet on Dec. 13, 2021.
English abstract of CN107371878 retrieved from Espacenet on Dec. 13, 2021.
English abstract of CN107690906 retrieved from Espacenet on Dec. 13, 2021.
English abstract of CN107820804 retrieved from Espacenet on Dec. 13, 2021.
English abstract of CN107836179 retrieved from Espacenet on Dec. 13, 2021.
English abstract of CN107926234 retrieved from Espacenet on Dec. 13, 2021.

* cited by examiner

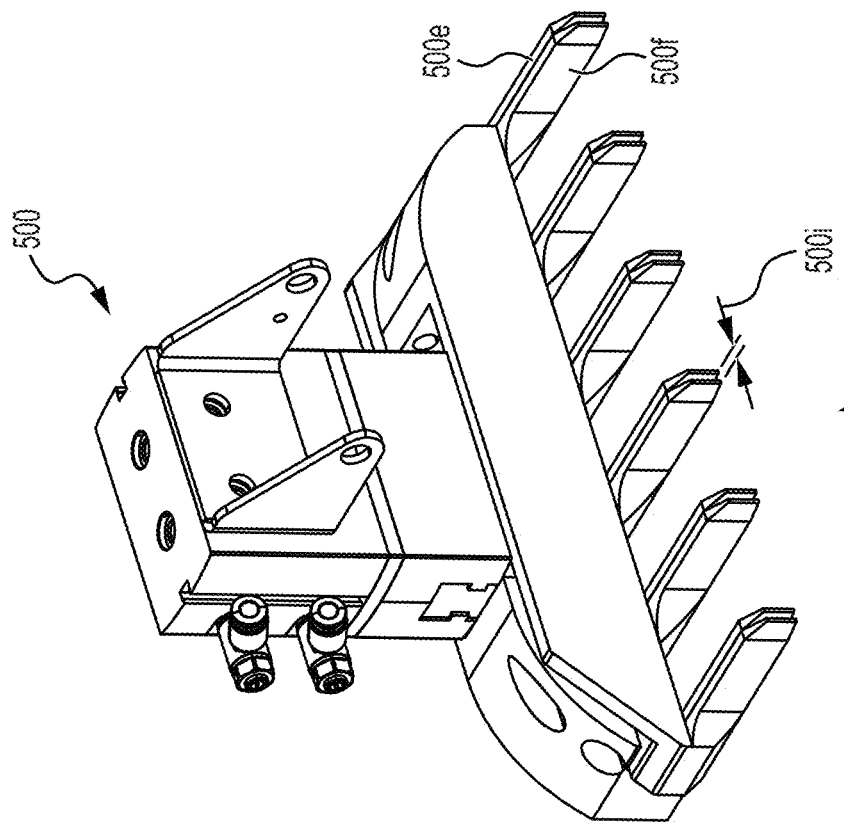
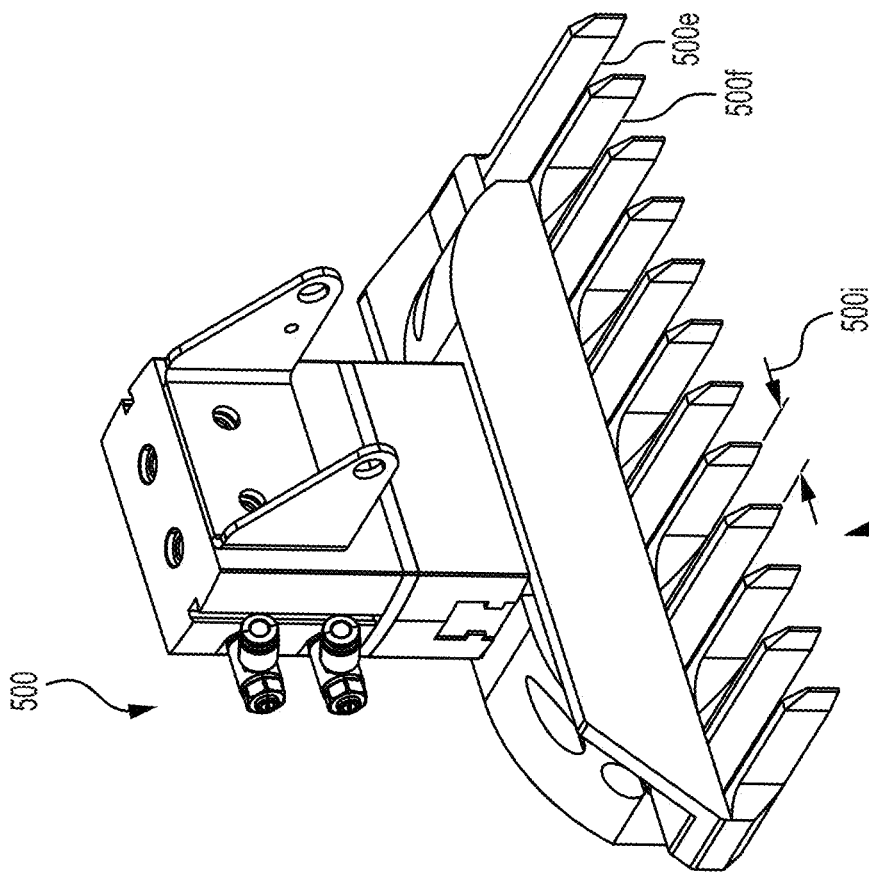

APPARATUS FOR FEEDING A TRANSPLANTER AND A METHOD FOR FEEDING A TRANSPLANTER

CROSS-REFERENCE TO RELATED APPLICATIONS

This application claims the benefit of U.S. Provisional Patent Application No. 63/156,038, filed on Mar. 3, 2021, the content of which is incorporated by reference in its entirety herein.

TECHNICAL FIELD

The present technology relates to a transplanter, more particularly to apparatus and method for feeding a transplanter of viable plants from a multi-celled tray.

BACKGROUND

Transplanters are well known and widely used in the agricultural domain, these transplanting machines having revolutionized the way plantation owners prepare and exploit their planting fields. These semi or fully automatic transplanting machines allow the transplantation of nursed plants in an efficient way, at a planting speed that is impressive in most cases. Feeding such transplanters with plants remains a challenge for most agricultors though.

More particularly, different feeding devices have been designed over time to transfer the plants contained in a multi-celled tray or nursing tray to a plant dropping means integrated to the transplanters. Conventionally, the plants are picked by a fork transpercing their roots and are released in a plant dropping means. Such process may damage the plants and allow non-viable plants to be transplanted, which decreases the plantation efficiency in both cases. In addition, the conventional feeding devices are typically heavy, which results in a soil compaction, i.e. the transplanters equipped with conventional feeding devices compact the ground surface in an undesirable way owing to the weight of said transplanters, which can undesirably inhibit the growth of crops or plants. Moreover, the weight of transplanters equipped with conventional feeding devices makes difficult or even impossible in some cases to use said transplanters in some soil conditions, such as wet and soft soils for example. This limitation impairs an efficient exploitation of the plantation by its owner, which is undesirable.

In order to reduce the aforementioned drawbacks, there is a desire for an apparatus for continuously feeding a transplanter with viable plants without damaging said viable plants and is provided herein, and a method to do so to mitigate the above-mentioned issues is deemed desired and is provided herein as well.

SUMMARY

It is therefore an object of the present technology to ameliorate the situation with respect to at least one of the inconveniences present in the prior art.

It is also an object of the present technology to provide an apparatus for continuously feeding a transplanter with viable plants and a method to continuously feed a transplanter with viable plants from a multi-celled tray that are improved at least in some instances as compared with some of the prior art.

More particularly, according to an aspect of the present technology, there is provided an apparatus for continuously feeding a transplanter with viable plants which is compact, lightweight, and easy to be installed on existant transplanters or new transplanters, In some embodiments, the apparatus comprises a support frame connectable to the frame of the transplanter, a tray actuation means connected to the support frame, a pick up means connected to the support frame and a conveyor assembly connected to the support frame.

The support frame is connected to the frame via a base and includes a body extending from the base along a first direction which is normal to the frame, defining an upper portion and a lower portion.

The tray actuation means is configured to selectively move the multi-celled tray along the first direction. In some cases, the tray actuation means includes at least one of a conveyor, an elevator, a linear actuator, and a robotic arm. In some cases, the multi-celled tray slides downwardly along the first direction mainly by gravity and is selectively moved upwardly along the first direction by the tray actuation. The tray actuation means is adjustable to accommodate different types of multi-celled trays.

The pick up means is configured to pick up the plants from the multi-celled tray by grabbing their foliage and includes at least one actuator configured to selectively move the pick up means relative to the support frame. In some cases, the pick up means includes a gripper. In some cases, the pick up means includes a deflector for moving the leaves of the plants from the stem of the foliage to facilitate the picking operation. In some cases, the pick up means includes at least one actuator, which can include at least one of a first actuator configured for selectively pivoting the pick up means relative to the body, a second actuator configured for selectively moving the gripper transversally relative to the pick up means, a third actuator configured for selectively pivoting the gripper relative to the pick up means, and a fourth actuator configured for selectively move the gripper longitudinally.

The conveyor assembly is typically oriented along a second direction transversal to the first direction and includes an endless belt having a plurality of receptacles configured to receive the plants from the pick up means, the endless belt being nominally synchronized with the plant dropping means for ensuring the continuous feeding of the transplanter. The conveyor assembly selectively modifies its speed in order to skip an empty receptacle detected by at least one plant sensor and selectively re-establishes its nominal speed for ensuring the continuous feeding of the transplanter. The at least one plant sensor is at least one of an inductive sensor, a capacitive sensor, a proximity switch, an infrared sensor, a laser sensor, an electromechanical limit switch, a magnetic sensor, a photoelectric sensor, and an ultrasonic sensor.

In some embodiments, a controller operates at least one of the tray actuation means, the pick up means, and the conveyor assembly in a cooperative manner, and, in some cases, remotely via a wireless communication system.

In some embodiments, at least one of the tray actuation means and the pick up means selectively moves stepwise along the first direction in accordance to a pre-determined pattern depending on the type of plants to be picked.

According to another aspect of the present technology, there is provided a gripper configured to selectively pick up at least one viable plant by its foliage and in a way that minimizes the damage to it during the transfer operation from the multi-celled tray to the plant dropping means of the transplanter.

The gripper comprises a first member, a second member substantially adjacent to the first member, and a gripper actuating means operatively connected to at least one of the first and second members. In some cases, the second member is disposed on top of and parallel to the first member.

Each of the first and second members has respectively a member body and a plurality of protrusions extending from the member body in a protruding direction parallel to the longitudinal center plane. The plurality of protrusions of the first and second members are spaced by a gap. In some cases, the plurality of protrusions is made of a non-metallic material. In some cases, at least one portion of the plurality of protrusions is coated with a soft and resilient material. In some cases, the plurality of protrusions is made of a composite material including polyethylene terephthalate glycol and carbon fiber.

The gripper actuating means is configured to move the at least one of the first and second members relative to the longitudinal center plane from an opened position such that the gap is maximal to a closed position such that the gap is minimal and adapted to pick up the plant by its foliage. In some cases, the first and second members are operatively connected to the actuating means such that both first and second members move relative to the center transversal plane.

In some embodiments, the actuating means is a pneumatic actuator.

In some embodiments, the gap is adjustable for picking up a specific type of plant by its foliage.

According to another aspect of the present technology, a method to continuously feed a transplanter comprising a plant dropping means with viable plants from a multi-celled tray that ensures minimum damage to the plants to be transplanted is disclosed.

The method comprises the steps of providing a multi-celled tray filled with a plurality of plants; picking up at least one of the plurality of plants by its foliage with a pick up means; transferring the at least one of the plurality of plants to a conveyor assembly having an endless belt and a plurality of receptacles connected to the endless belt, each receptacle being configured to receive one plant; detecting empty receptacles with at least one sensor; and operating the conveyor assembly to skip empty receptacles detected by the at least one sensor and continuously feed the plant dropping means with plants having foliage.

In some embodiments, the step of operating the conveyor assembly to skip empty receptacles includes selectively modifying the speed of the endless belt for skipping empty receptacles and selectively re-establishing the nominal speed of the endless belt for ensuring the continuous feeding of the plant dropping means at the planting speed.

In some embodiments, the at least one sensor is at least one of an inductive sensor, a capacitive sensor, a proximity switch, an infrared sensor, a laser sensor, an electromechanical limit switch, a magnetic sensor, a photoelectric sensor, and an ultrasonic sensor.

In some embodiments, the method further comprises preparing the apparatus prior use, the step of preparing the apparatus including at least one of configuring the pick up means for a specific type of plant, configuring the conveyor assembly for receiving a specific type of plant, and adjusting the support frame to accommodate a specific type of multi-celled tray.

In some embodiments, the pick up means picks up a row of plants from the multi-celled tray in at least one sequence.

In some embodiments, at least one step of the method is cooperatively operated by a controller which, in some cases, is remotely operated via a wireless communication system.

According to another aspect of the present technology, an agricultural vehicle comprising at least one apparatus is disclosed.

The at least one apparatus comprises a support frame connectable to the frame of the transplanter, a tray actuation means connected to the support frame, a pick up means connected to the support frame and a conveyor assembly connected to the support frame, as described above. In some embodiments, the at least one apparatus replaces at least one existing feeding device different from the at least one apparatus. In some embodiments, the at least one apparatus coexists with at least one existing feeding device different from the at least one apparatus.

In some embodiments, the agricultural vehicle further comprises a master controller operating the at least one apparatus, wherein in some cases, the master controller is remotely operable via a wireless communication system.

Embodiments of the present technology each have at least one of the above-mentioned object and/or aspects, but do not necessarily have all of them. It should be understood that some aspects of the present technology that have resulted from attempting to attain the above-mentioned object may not satisfy this object and/or may satisfy other objects not specifically recited herein.

Additional and/or alternative features, aspects, and advantages of embodiments of the present technology will become apparent from the following description, the accompanying drawings, and the appended claims.

BRIEF DESCRIPTION OF THE DRAWINGS

For a better understanding of the present technology, as well as other aspects and further features thereof, reference is made to the following description which is to be used in conjunction with the accompanying drawings, where:

FIG. 15A/B is a perspective view taken from a top, front, right side of the gripper of FIG. 13 in opened position/closed position;

DETAILED DESCRIPTION

Introduction

The description of the present technology, which relates to various embodiments of an apparatus for continuously feeding a transplanting machines (namely referenced herein as "transplanter"), is intended to be a description of illustrative examples of the present technology.

It is to be expressly understood that the various embodiments of the apparatus are merely embodiments of the present technology. Thus, the description thereof that follows is intended to be only a description of illustrative examples of the present technology. This description is not intended to define the scope or set forth the bounds of the present technology. In some cases, what are believed to be helpful examples of modifications or alternatives to apparatus may also be set forth below. This is done merely as an aid to understanding, and, again, not to define the scope or set forth the bounds of the present technology. These modifications are not an exhaustive list, and, as a person skilled in the art would understand, other modifications are likely possible. Further, where this has not been done (i.e. where no examples of modifications have been set forth), it should not be interpreted that no modifications are possible and/or that what is described is the sole manner of implementing or embodying that element of the present technology. As a person skilled in the art would understand, this is likely not the case. In addition, it is to be understood that the apparatus may provide in certain aspects a simple embodiment of the present technology, and that where such is the case it has been presented in this manner as an aid to understanding. As persons skilled in the art would understand, various embodiments of the present technology may be of a greater complexity than what is described herein.

Transplanting Machine ("Transplanter")

It is to be expressly understood that the planting machine or transplanting machine (namely referenced herein as "transplanter") is merely an example of a machine on which the apparatus can be installed on, but the description of said transplanter is not intended to define the scope or set forth the bounds of the present technology.

For clarity purposes, a transplanter 10 is schematically shown on FIGS. 1-3 and 23-24 and described as a machine comprising a frame 10a supporting a plurality of ground-engaging means 10b (e.g. wheels, crawlers, etc.), and a plant dropping means 10c.

Figure 1:
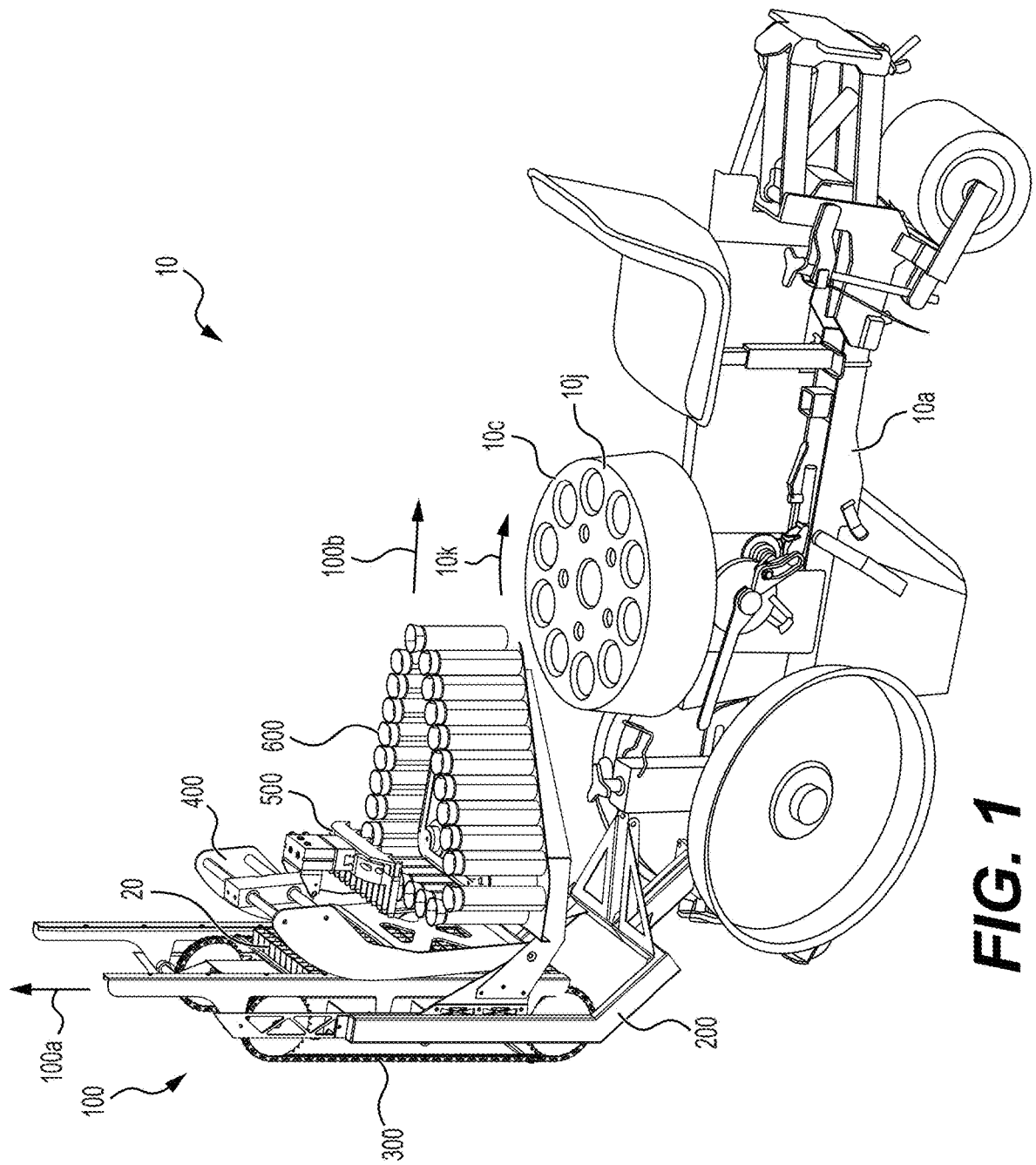
FIG. 1 is a perspective view taken from a top, rear, left side of a transplanter equipped with an apparatus according to one embodiment of the present technology.
Figure 2:
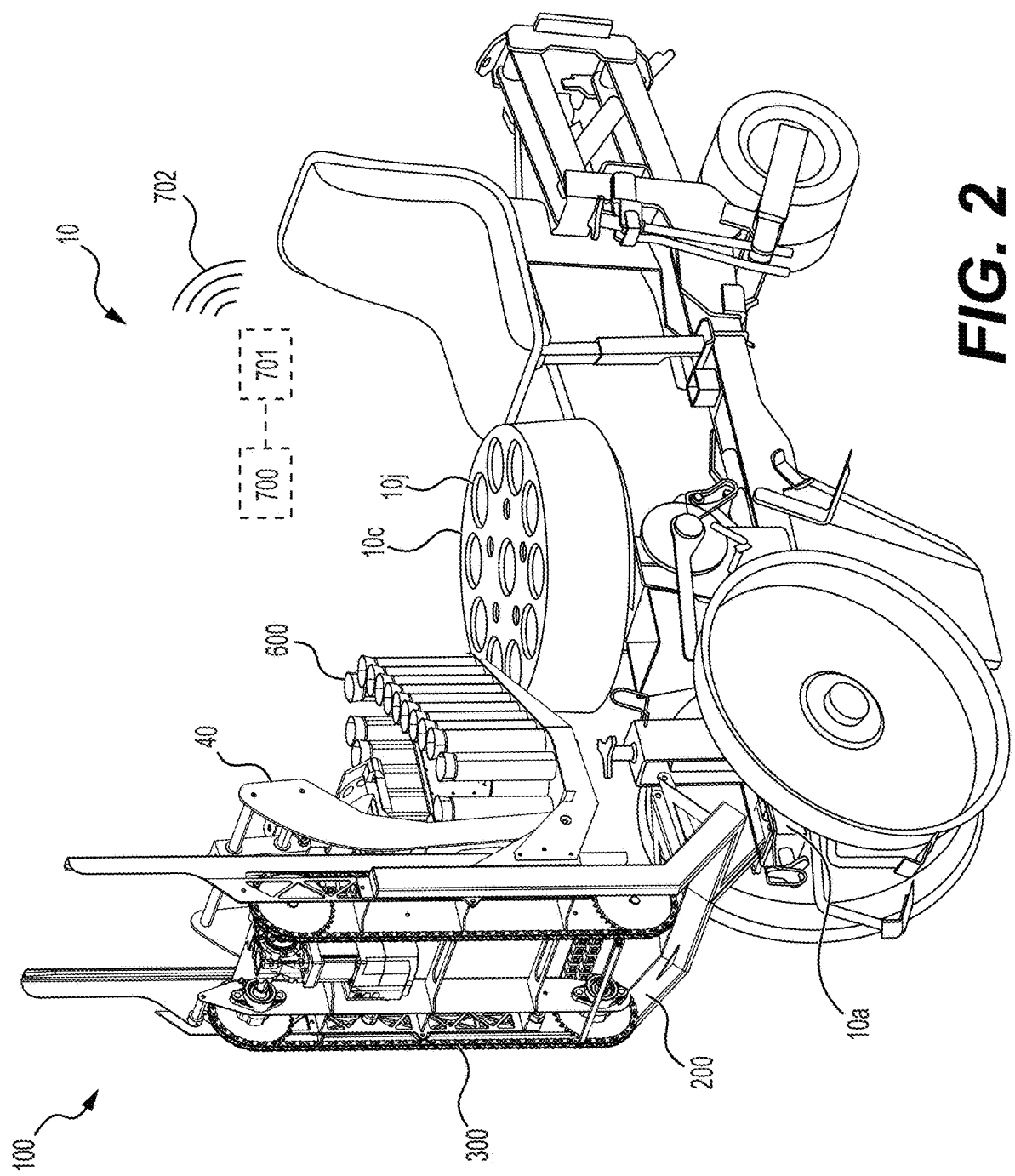
FIG. 2 is a perspective view taken from a top, front, left side of the transplanter of FIG. 1.
Figure 3:
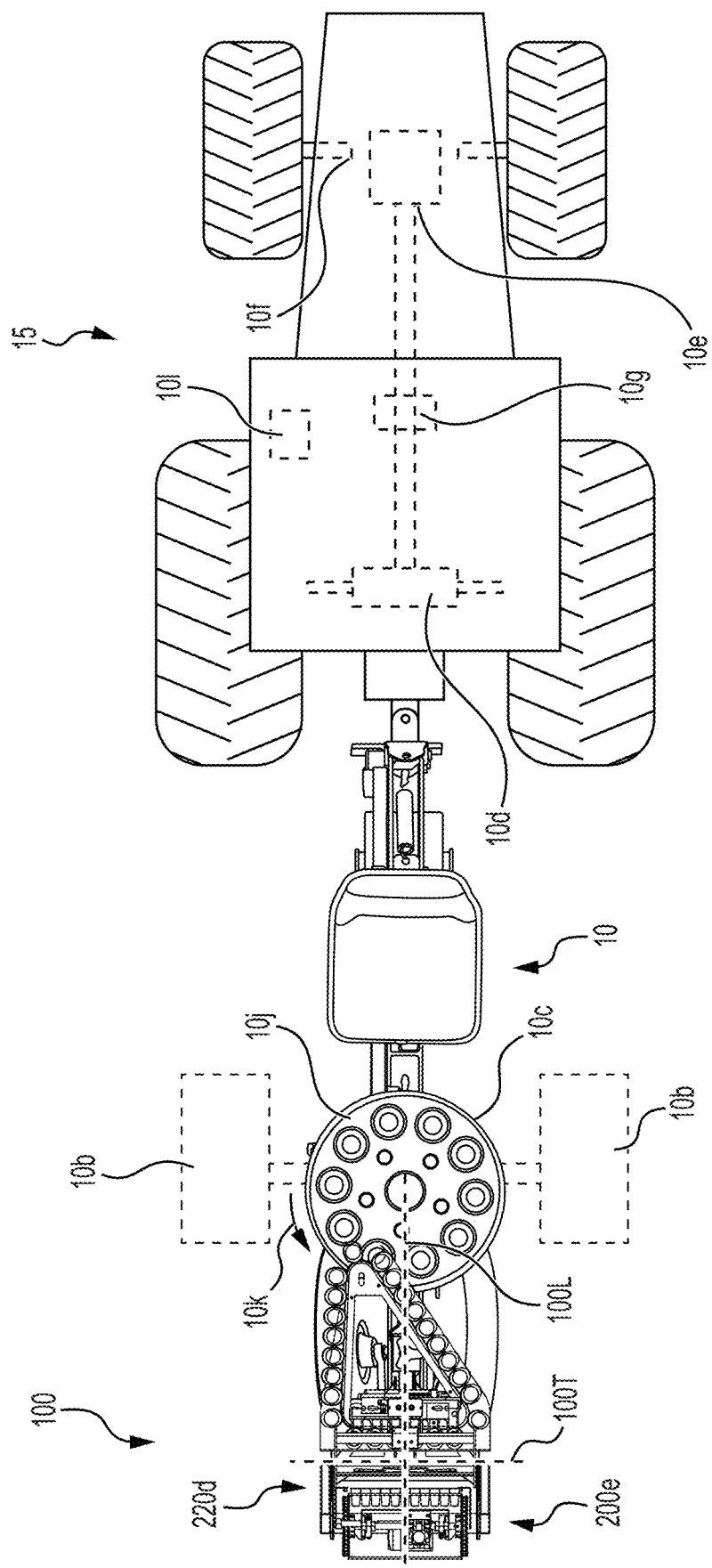
FIG. 3 is a top view of the transplanter of FIG. 1, towed by an agricultural vehicle.

In the present embodiment, the transplanter 10 is a towed transplanter or an implement towed by a motorized machine 15, such as an agricultural vehicle (e.g. a tractor) for instance, having a propulsion means 10d including an engine 10e, a steering mechanism 10f, and a speed controlling means 10g (distance/h) defining a planting speed 10i (plants/h), which ensures a constant spacing between the plants, as schematically shown on FIG. 3. In such cases, it is understood that the frame is an implement frame. As this type of transplanter is conventional and well known in the art, no further description is deemed necessary for a person ordinary skilled in the art to understand the scope of the term "towed transplanter" and its variants.

In some embodiments, the transplanter 10 is a motorized transplanter typically having a propulsion means 10d' including an engine 10e', a steering mechanism 10f', and a speed controlling means 10g' defining a transplanter speed 10h' (distance/h) defining a planting speed 10i' (plants/h) which ensures a constant spacing between the plants. As this type of transplanter is conventional and well known in the art, no further description is deemed necessary for a person ordinary skilled in the art to understand the scope of the term "motorized transplanter" and its variants.

Once again, the frame 10a is considered as being at least one of a transplanter frame and an implement frame, unless otherwise specified.

In some cases, the plant dropping means 10c includes a carousel 10j defining a rotational speed 10k synchronized with the planting speed 10i of the transplanter 10, i.e. being configured to drop the required amount of plants per hour (planting speed 10i) according to the speed of the transplanter 10 (transplanter speed 10h).

In some cases, a power source 10l is mounted on the frame 10a of the transplanter 10 or on the motorized machine 15, for providing power to the various mechanical components on the transplanter 10. It is understood that the power source 10l can be an air-compressor or any equivalent power source, such as hydraulic system, electric system, hybrid system, combustion system, etc. to power compatible mechanical components. It is also contemplated that the power source 10l can be part of the apparatus 100, i.e. the apparatus 100 being power self-sufficient.

Figure 5:
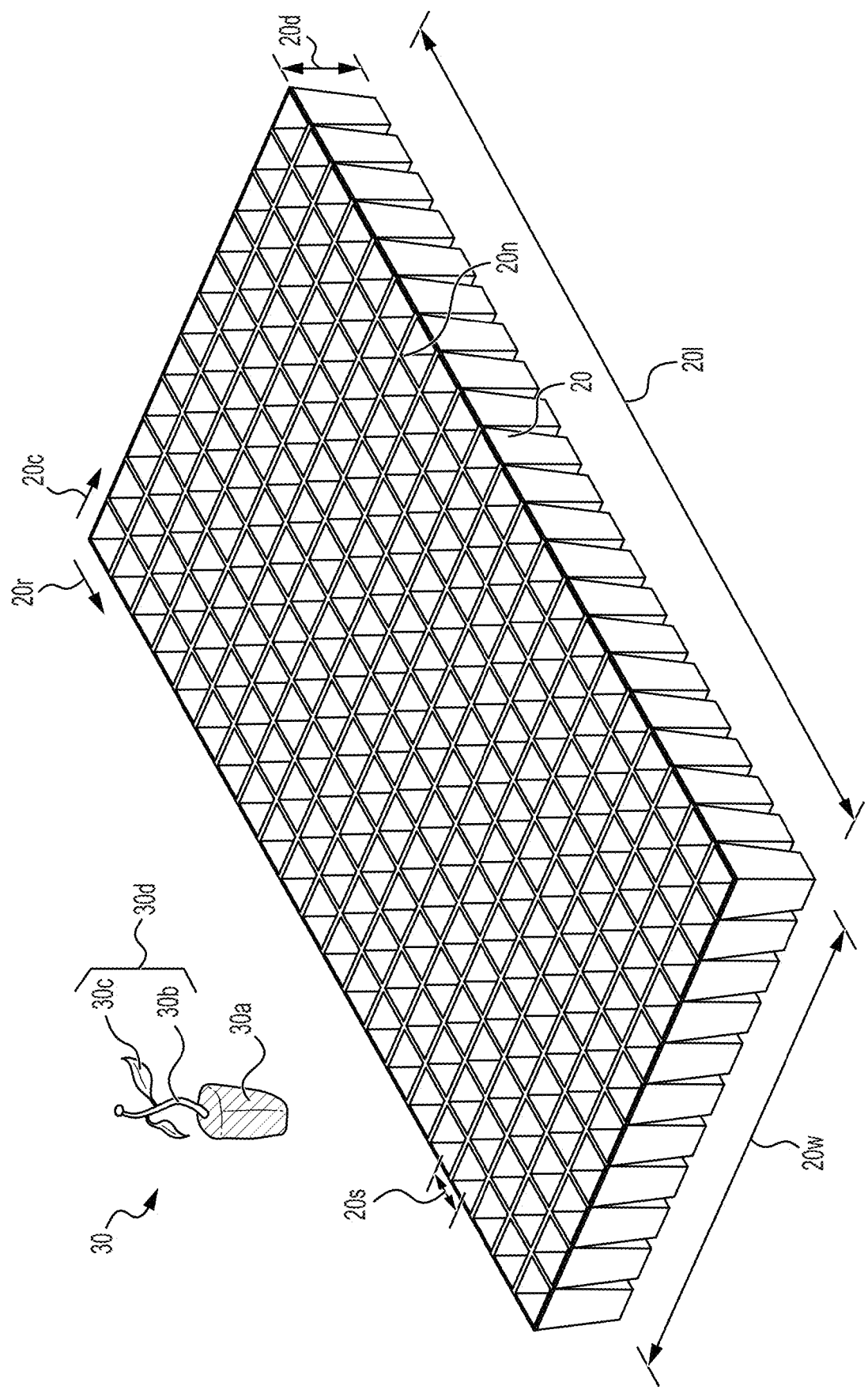
FIG. 5 is a perspective view taken from a top, front, left side of a multi-celled tray and of a plant.

The transplanter 10 is fed with plants contained in at least one multi-celled tray 20 having a plurality of cells 20n disposed along a plurality of adjacent rows 20r and a plurality of adjacent columns 20c, as shown on FIG. 5. Multi-celled trays are widely used in the industry, and the multi-celled trays may differ in depth 20d, width 20w, length 20l, and in spacing 20s between adjacent rows of cells 20n. As it will be described further, the apparatus 100 is ajustable to accommodate different types of multi-celled trays 20. Each cell of the plurality of cells 20n is configured to contain a plant 30. More specifically, each cell will mainly contain a root ball 30a of a plant 30, from which extends outwardly a foliage 30d comprising at least one of a stem 30b and a leaf 30c. A plant 30 having a foliage 30d is herein referenced as a "viable plant", in opposition to a plant 30 without foliage 30d, which is herein referenced as a "non-viable plant" or a "dead plant".

General Description

With reference to FIGS. 6 to 9, an apparatus 100 for feeding a transplanter 10 is described. The apparatus 100 comprises a support frame 200, a tray actuation means 300, a pick up means 400 including a gripper 500, and a conveyor assembly 600, the tray actuation means 300, the pick up means 400, and the conveyor assembly 600 operating in a cooperative manner.

In some embodiments, at least one of the tray actuation means 300, the pick up means 400 and the conveyor assembly 600 is operated by a controller 700.

The apparatus 100 defines a longitudinal center plane 100L and a transversal center plane 100T.

The apparatus 100 is particularly suitable for retrofitting existing transplanters by providing connectable portions, and by being cost-effective in comparison to buying a new transplanter with an integrated feeding device. In addition, the apparatus 100 is designed and optimized to be very compact and lightweight, in order to allow dense plantation (i.e. with minimal distance between adjacent rows of plantation) and to keep the total weight of the transplanter to an acceptable value in order to avoid severe soil compaction and power consumption, among other things. It is well known that heavy machineries cannot be used in soft terrains, which can limit the exploitation of a plantation, in some cases.

The overall dimensions of the apparatus 100 is approximately between 16" and 18" wide, and the overall weight of the apparatus 100 is approximatively between 80 lbs and 120 lbs. It is understood that these values are for reference only, mainly to illustrate the compactness and the lightness of the apparatus 100, especially in comparison to existing feeders found in the prior art which are typically extensively heavier and wider.

In addition, the apparatus 100 is theoretically compatible to any type of plants, e.g. lettuces (leaf lettuce, iceberg lettuce, romaine lettuce, etc.), cruciferous (cauliflower, broccoli, etc.), bulb vegetables (leek, onions, etc.), etc., since the apparatus 100 is adaptable to accommodate different types and sizes of plants, different types of multi-celled trays, different planting speeds (i.e. ultimately the distance between transplanted plants), etc.

Support Frame

Figure 4:
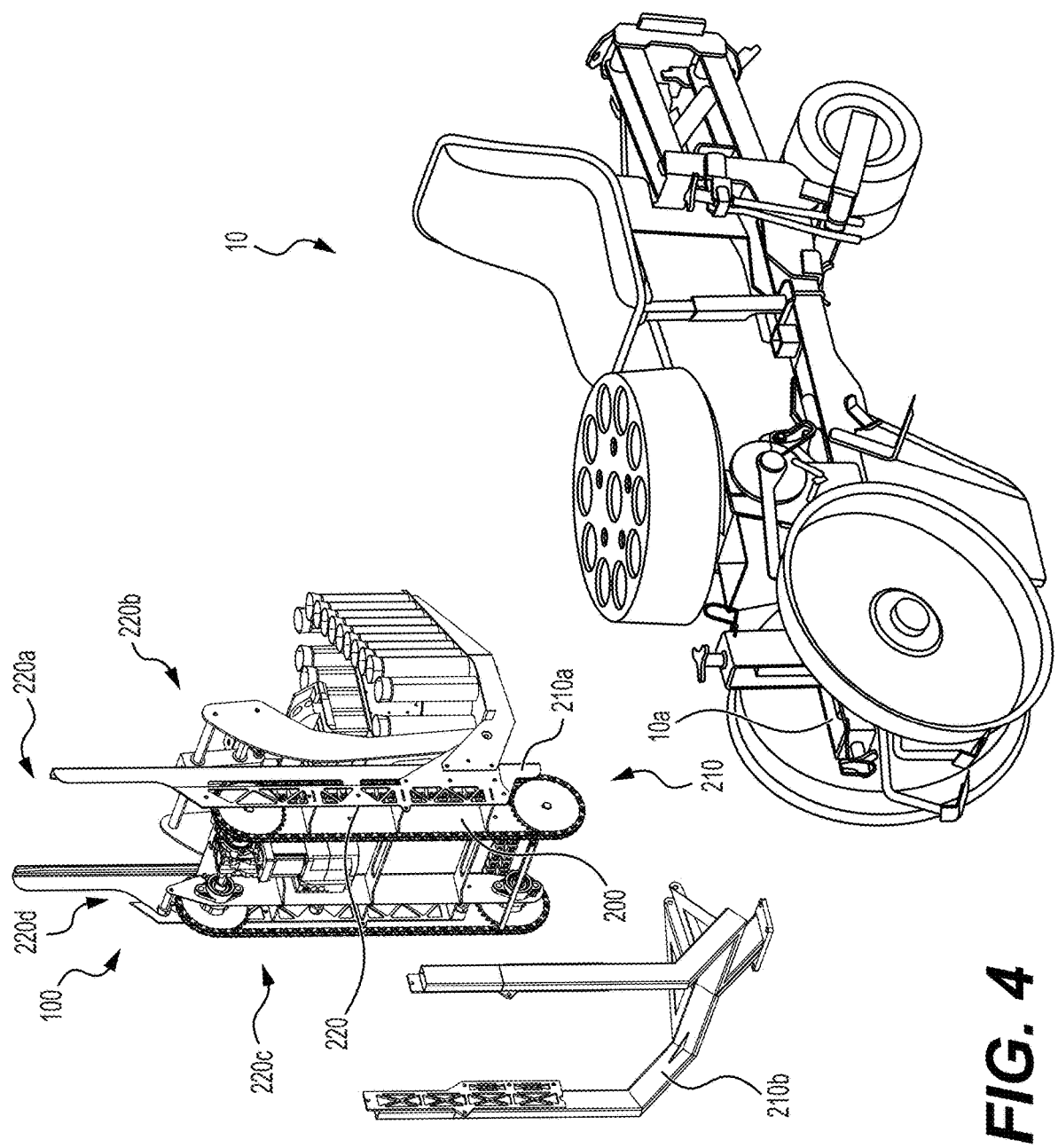
FIG. 4 is a partially exploded, perspective view taken from a top, front, left side of the transplanter of FIG. 1.
Figure 6:
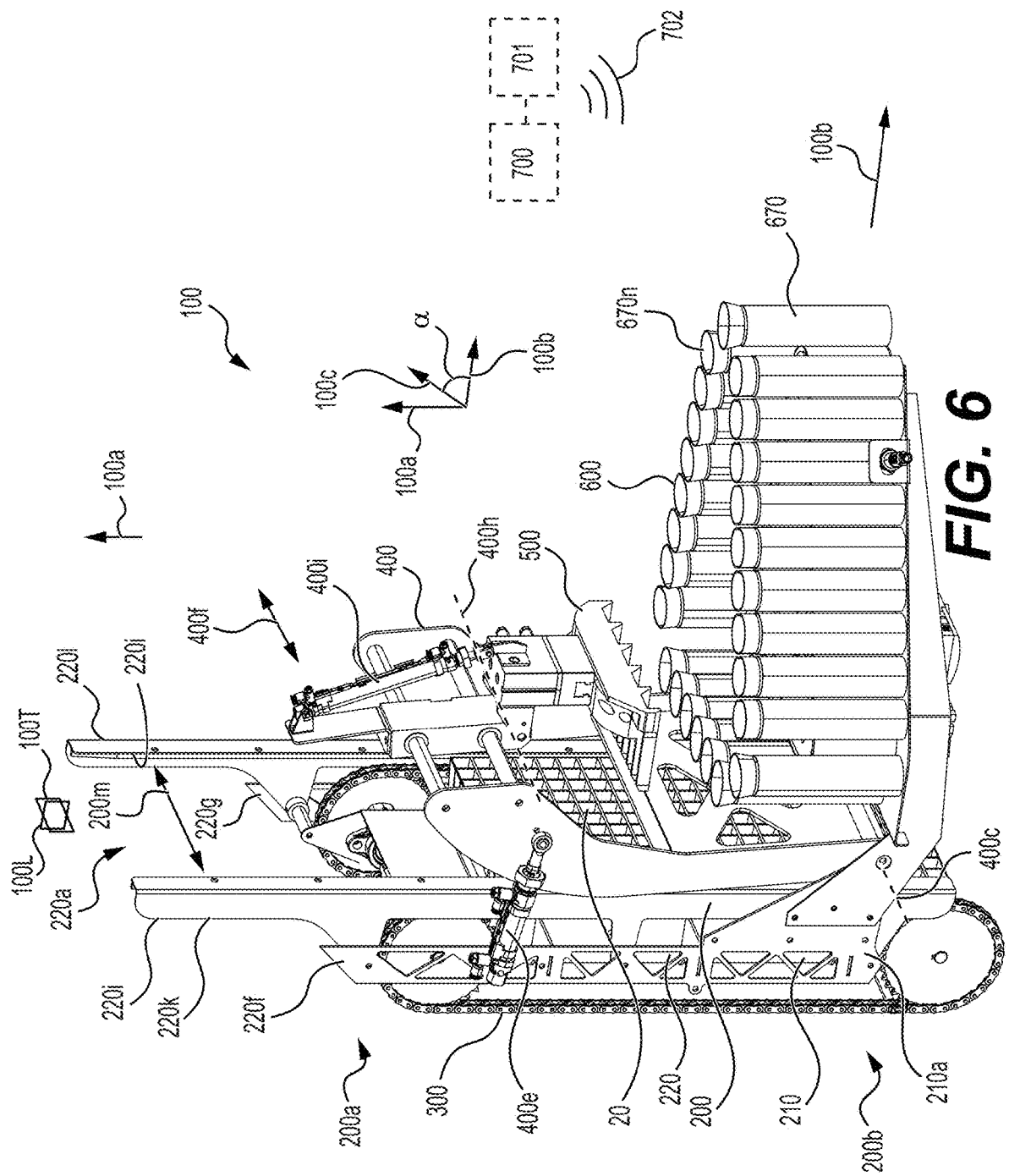
FIG. 6 is a perspective view taken from a top, front, right side of the apparatus of FIG. 1.
Figure 7:
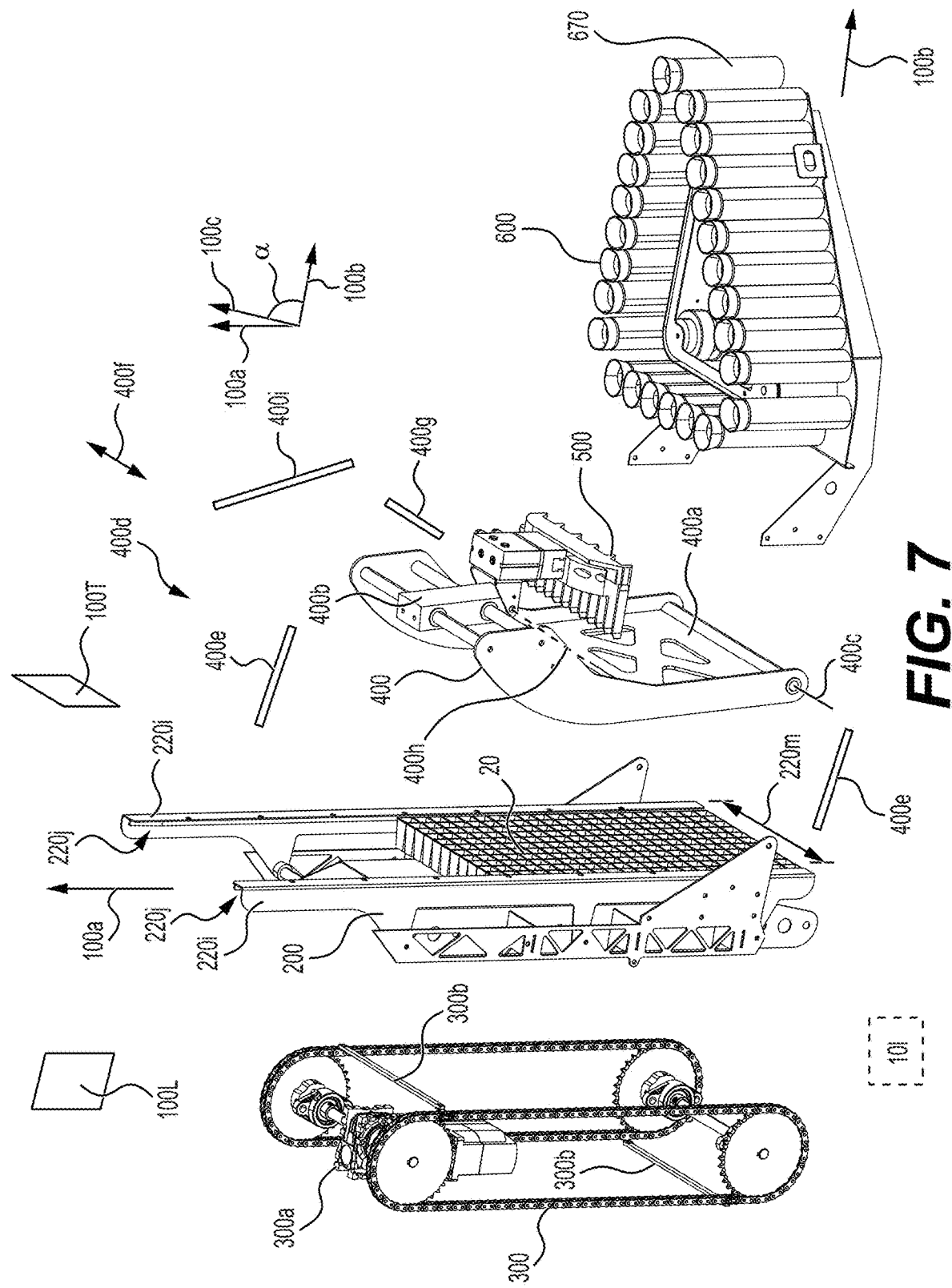
FIG. 7 is a partially exploded, perspective view taken from a top, front, right side of the apparatus of FIG. 6.
Figure 8:
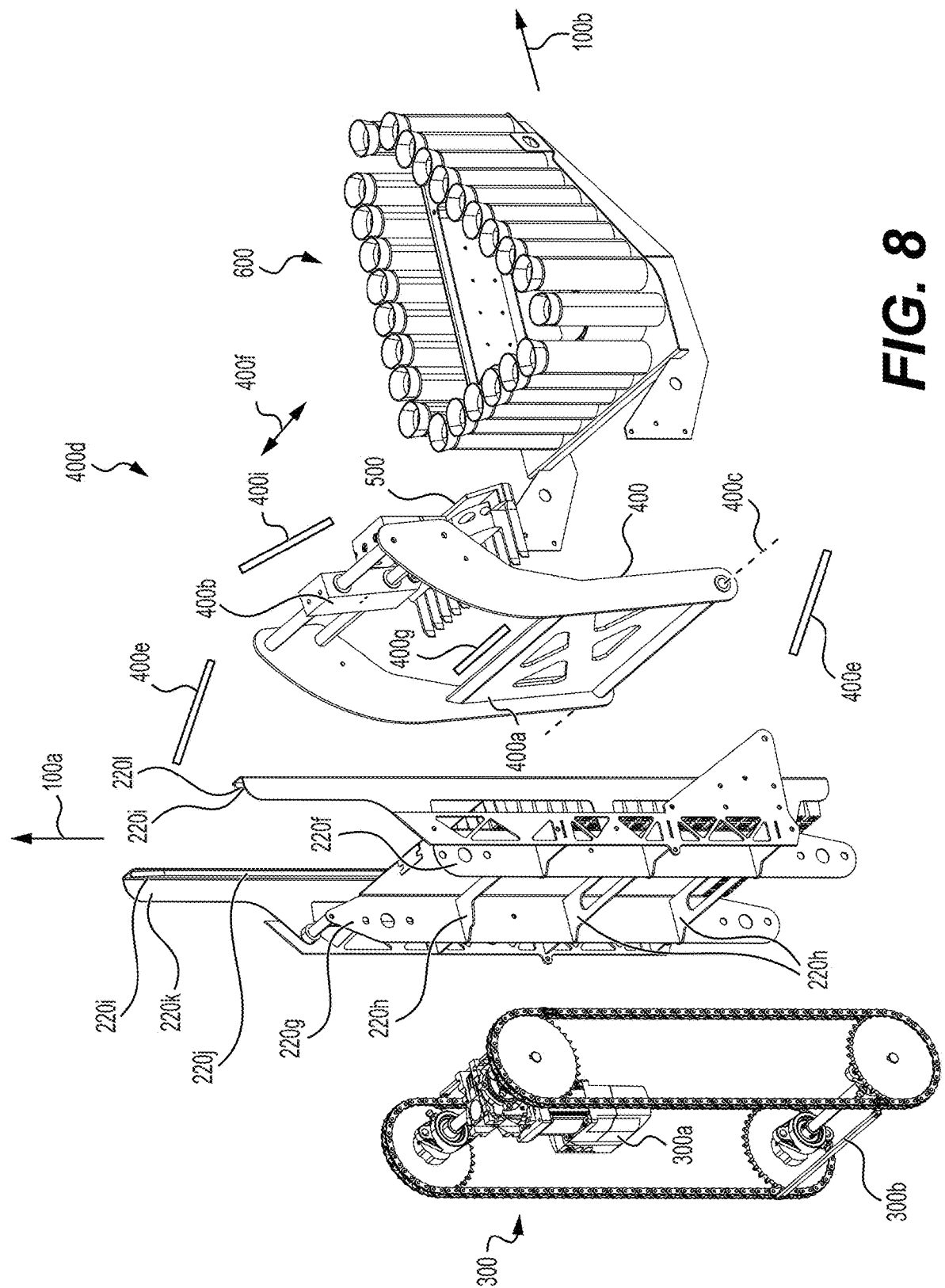
FIG. 8 is a partially exploded, perspective view taken from a top, rear, right side of the apparatus of FIG. 6.
Figure 9:
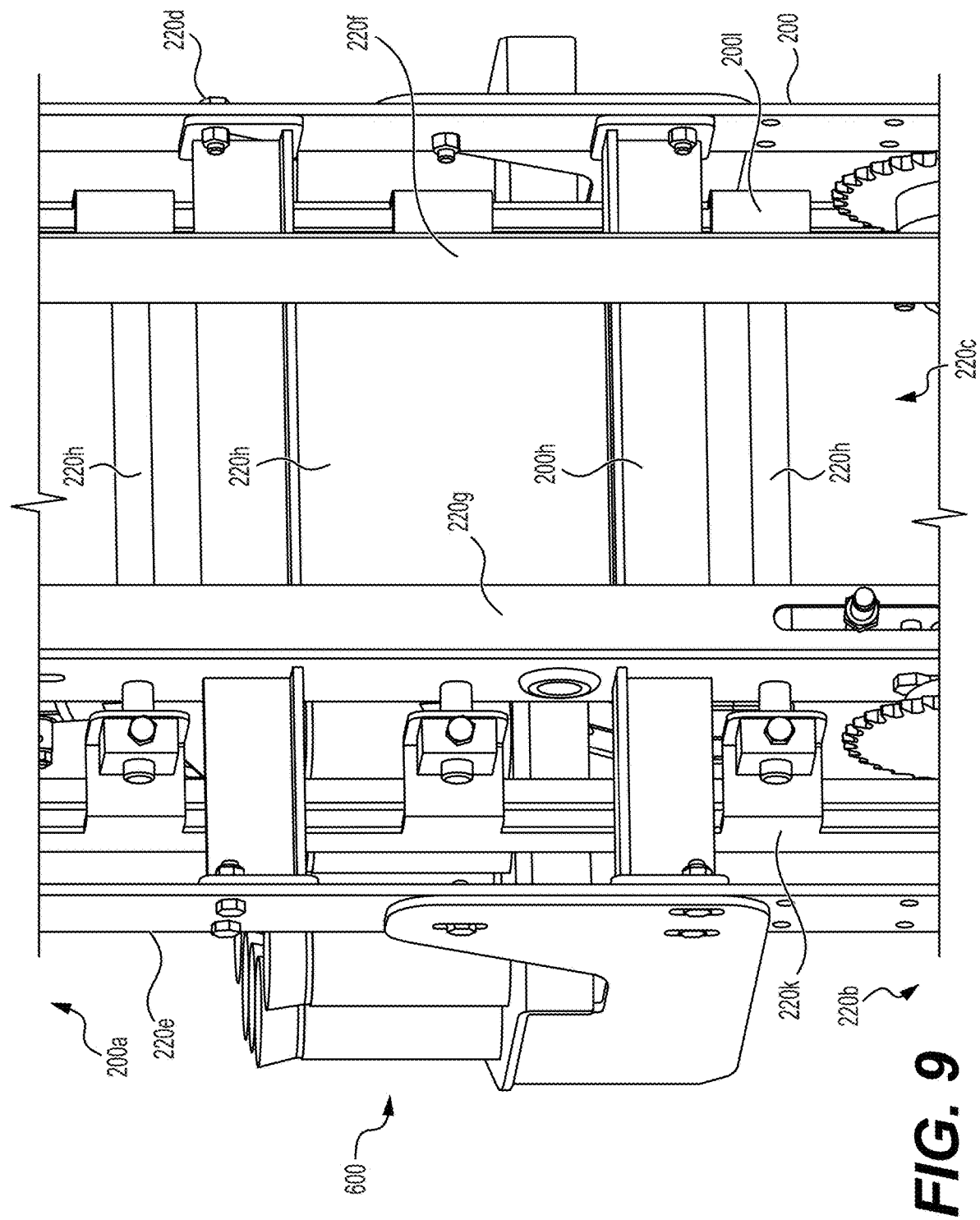
FIG. 9 is a close-up, perspective view taken from a top, rear, left side of the apparatus of FIG. 6.
Figure 10:
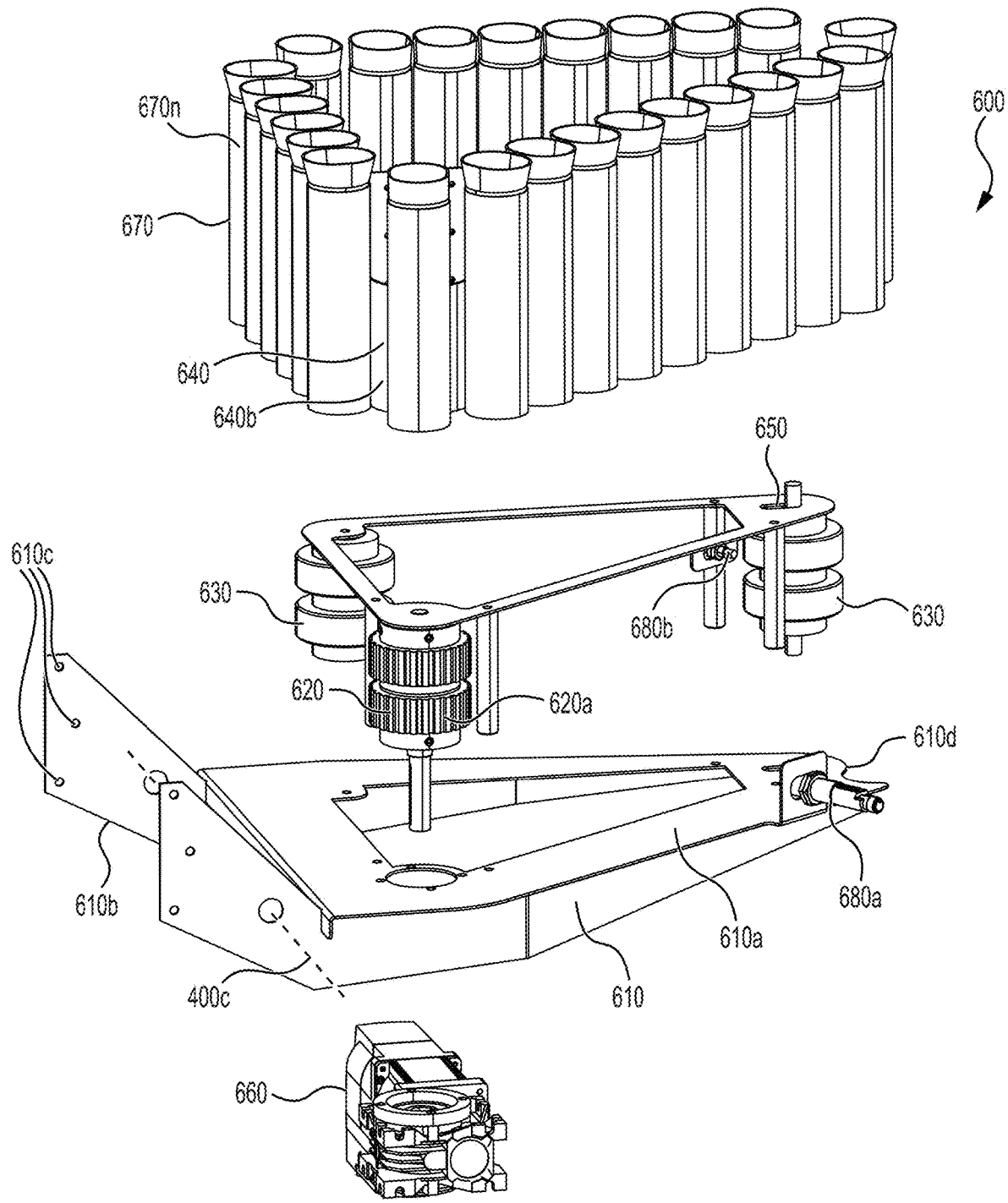
FIG. 10 is a partially exploded, perspective view taken from a top, rear, right side of the conveyor assembly of the apparatus of FIG. 6.
Figure 11:
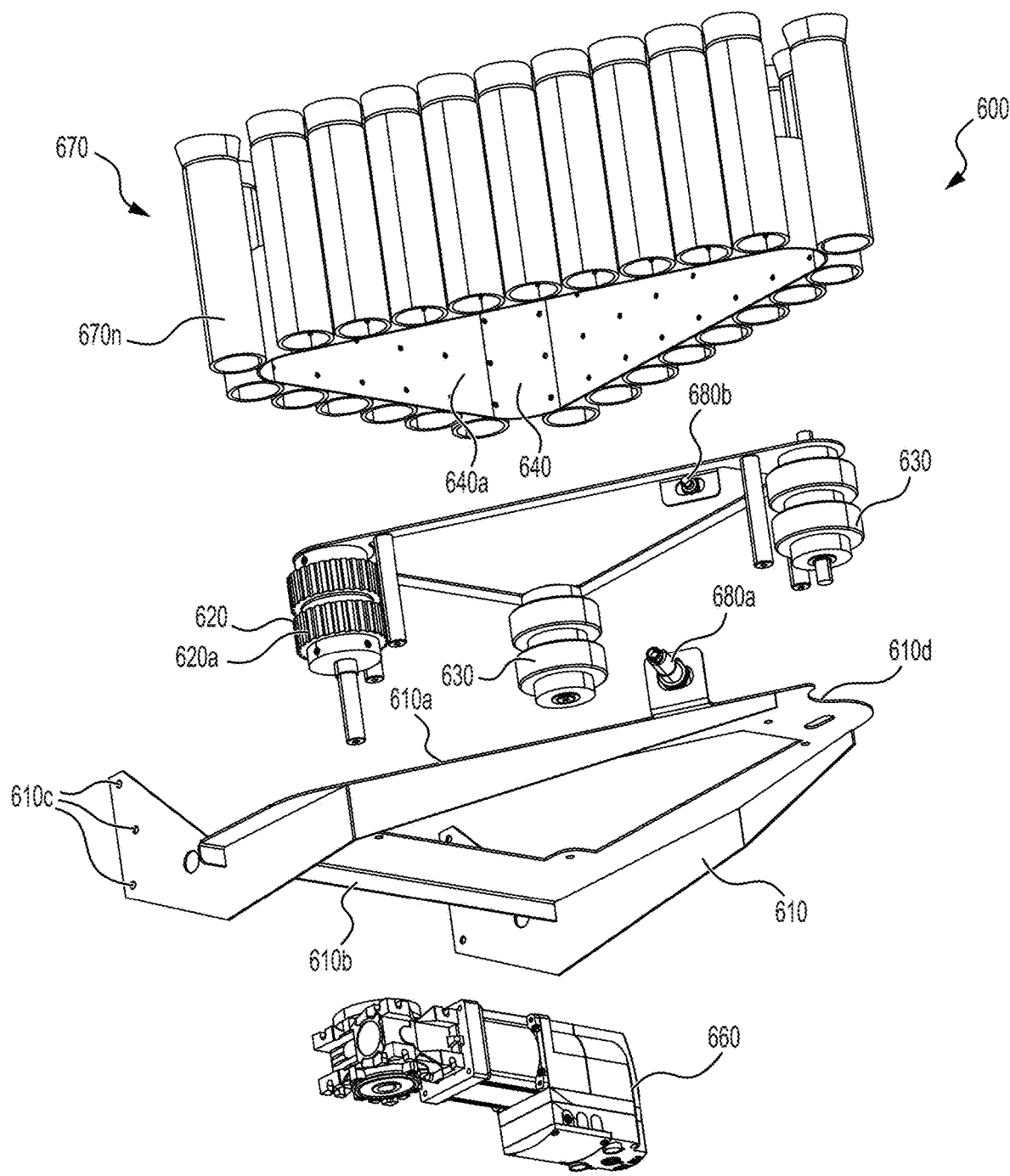
FIG. 11 is a partially exploded, perspective view taken from a bottom, rear, right side of the conveyor assembly of the apparatus of FIG. 6.

Referring to FIGS. 4 and 7-8, the support frame 200 is configured to be connected to the transplanter 10 and includes a base 210 configured to face the frame 10a, and a body 220 connected to the base 210, extending from the base 210 along a first direction 100a and defining an upper portion 200a and a lower portion 200b, where the first direction 200a is typically normal to the frame 10a, but can be aligned in a different direction 100c defined by an angle α as well, as shown on FIG. 6. In some embodiments, the angle α is less than 90 degrees relative to the frame 10a, in order to urge down the foliage 30d of the plants 30 by gravity, passively bending said foliage 30d downwardly and thus clearing the leaves 30c from the stems 30b, which can facilitate the picking operation in some cases, as it will further be described.

Base

More particularly, the base 210 defines an interface portion 210a adapted to be connectable to the frame 10a of the transplanter 10 (or the frame of the implement). In some embodiments, the interface portion 210a is designed (shaped, sized, etc.) to fit on existing transplanter 10 for retrofitting purposes. In some embodiments, the interface portion 210a includes an extension 210b connected to the frame 10a and extending outwardly from said frame 10a, when the existing transplanter 10 does not have enough space to receive the apparatus 100, for instance. In some cases, minor modifications of the existing transplanter 100 are required, such as drilling new mounting holes for bolting the base 210 or the extension 210b to the frame 10a, or welding additional reinforcement parts for instance.

Preferably, the base 210 is removably connected to the frame 10a by using fasteners, in order to advantageously allow removal of the apparatus 100 from the transplanter 10 if required for maintenance, troubleshooting, or replacement by example. Additional detail will be further provided below.

In some embodiments, the base 210 is permanently connected to the frame 10a by welding it to the frame 10a, by example. One of these embodiments can be when the frame 10a is an implement frame, wherein said implement is designed, shaped, and sized especially for receiving at least one apparatus 100. Other configurations are contemplated as well.

In some embodiments, the base 210 is integral to the body 220, i.e. is part of said body 220 and the support frame 200 is thus considered as being a "one-piece" structure. In these cases, it is understood that the support frame 200 is thus connected to the frame 1a by the interfacing portion 210a.

Body

In addition, the body 220 further comprises a top portion 220a opposite the base 210, a front portion 220b facing the transplanter 10, a back portion 220c opposite the front portion 220b, a left side portion 220d and a right side portion 220e.

The left side portion 220d comprises a first support member 220f and the right side portion 220e comprises a second support member 220g parallel to and spaced from the first support member 220f. Additionally, at least one transverse member 220h connects the left portion 220d to the right portion 220e.

In some embodiments, the body 220 comprises at least one guiding means 220i forming at least one guiding surface 220j for guiding the multi-celled tray 20 along the first direction 100a. In some embodiments, the at least one guiding means 220i includes extruded profiles, channels, angle beams, stoppers, or any equivalent structure and is configured to limit the movement of the multi-celled tray 20 in the transversal direction (i.e. parallel to the transversal center plane 100T).

In some embodiments, the at least one guiding means 220i includes a first guiding means 220k and a second guiding means 220l laterally spaced from the first guiding means 220k by a distance 220m, at least one of the first guiding means 220k and the second guiding means 220l being selectively movable along said transversal direction in order to modify the distance 220m, in order to accommodate different types of multi-celled trays 20. More specifically, the distance 220m between the first guiding means 220k and the second guiding means 220l can be modified to accommodate the width 20w of the multi-celled tray 20, in order to ensure adequate guidance of said multi-celled tray 20 along the first direction 100a. In some embodiments, the selectively movable connection between the at least one of the first guiding means 220k and the second guiding means 220l is allowed by selectively sliding said at least one of the first guiding means 220*k* and the second guiding means 220*l* along the transversal direction on one of the at least one transverse member 220*h* for instance, as shown on FIG. 9. In some embodiments, the at least one of the first guiding means 220*k* and the second guiding means 220*l* is indexed along the transversal direction by predetermined increments. It is understood that other configurations are contemplated as well. In some embodiments, the at least one guiding means 220*i* is adaptable to accommodate different depths 20*d* of multi-celled trays 20 via elongated holes (slots) for instance. In other embodiments, the at least one guiding means 220*i* is replaced completely or partially to accommodate such different depths 20*d* of multi-celled trays 20.

The support frame 200 is typically made of metallic parts connected together by any techniques known in the art, such as fastening, welding, etc.

In some embodiments, the support frame 200 is made of non-metallic parts (e.g. composites materials) connected together by any techniques known in the art, such as fastening, etc.

Tray Actuation Means

As best shown on FIGS. 7-8, the tray actuation means 300 is connected to the body 220 and is configured to selectively move the multi-celled tray 20 along the first direction 100*a* via a mechanical device 300*a* powered by the power source 10*l* and comprising at least one of a conveyor, an elevator, a linear actuator, a robotic arm, a cam, a reciprocating mechanism, or any equivalent mechanical device designed to move linearly known in the art. In some embodiments, the tray actuation means 300 is configured to selectively move upwardly the multi-celled tray 20 along the first direction 100*a*, while the multi-celled tray 20 is sliding downwardly along the first direction 100*a* mainly by gravity. In some cases, the tray actuation means 300 retains the multi-celled tray 20 from falling down and maintains said multi-celled tray 20 at a specific distance along the first direction 100*a*.

It is contemplated that the tray actuation means 30 can carry the multi-celled tray 20 in various ways, so this aspect should not limit the scope of the present technology. For instance, in present technology, the multi-celled tray 20 abuts against a stopper 300*b* and is not mechanically attached or connected to the tray actuation means 300, in order to simplify and to speed up the feeding process of the transplanter 10. The multi-celled tray 20 is thus moved along the first direction 100*a* by the tray actuation means 30 and is guided or limited along the transversal direction by the at least one guiding means 220*i*. Other configurations are contemplated as well. For example, as mentioned, the at least one guiding means limits 220*i* the movement of the multi-celled tray 20 along the transversal direction. In some embodiments, the tray actuation means 300 is configured to guide the multi-celled tray 20 and limits the lateral movement of said multi-celled tray 20, complementarily or in replacement of the at least one guiding means 220*i*.

Pick Up Means

As best shown of FIGS. 7-8, the pick up means 400 is disposed at least partially in front of the body 220 and extending away from the front portion 220*b* of said body 220, defining a first portion 400*a* selectively pivotally connected to the body 220 and a second portion 400*b* spaced from the first portion 400*a*, and a gripper 500 selectively movably connected to the second portion 400*b*.

More particularly, the first portion 400*a* of the pick up means 400 is pivotally connected to the lower portion 200*b* of the support frame 200 preferably, since it lowers the center of mass of the apparatus 100, making it more stable in comparison to having the first portion 400*a* of the pick up means 400 pivotally connected to the upper portion 200*a* of the support frame 200. The first portion 400*a* of the pick up means 400 is preferably removably connected to the body 220, in order to advantageously allow removal of the pick up means 400 from the body 220 if required for maintenance, troubleshooting, or replacement by example. The pivotal connection between the first portion 400*a* of the pick up means 400 and the body 220 is rotating about a first pivot axis 400*c* and operated by at least one actuator 400*d* including a first actuator 400*e* operated by the controller 700. Other configurations are contemplated as well.

The second portion 400*b* of the pick up means 400 is configured to connect to the gripper 500. The gripper 500 is preferably fastened to the second portion 400*b*, i.e. allowing a removable connection between said gripper 500 and pick up means 400, in order to advantageously allow removal of the gripper 500 from the pick up means 400 if required for maintenance, troubleshooting, or replacement by example. Other configurations are contemplated as well.

Now referring to FIGS. 13 to 17A/B, the gripper 500 is configured for selectively picking up at least one plant 30 from the multi-celled tray 20 by its foliage 30*d*. The gripper 500 defines a gripper longitudinal center plane 500L and a gripper transversal center plane 500T and comprises a first member 500*a*, a second member 500*b* adjacent to the first member 500*a*, preferably disposed on top of the first member 500*a* but not necessarily, and parallel to the first member 500*a* but not necessarily, each of the first and second members 500*a*, 500*b* having respectively a member body 500*c*, 500*d* and a plurality of protrusions 500*e*, 500*f* extending from respectively the first and second bodies 500*c*, 500*d* along a protruding direction 500*g*, 500*h* respectively preferably parallel to the gripper center transversal plane 500T, the plurality of protrusions 500*e*, 500*f* of the first and second members 500*a*, 500*b* being preferably aligned and longitudinally spaced by a gap 500*i*. It is understood that other configurations are contemplated as well, such as, but without being limited to, having the second member 500*b* disposed behind the first member 500*a* (instead of being disposed on top of said first member 500*a*) with the each protrusion of the second plurality of protrusions 500*f* extending through the first member body 500*c* in apertures between each protrusion of the first plurality of protrusions 500*e*. It is also understood that the first protruding direction 500*g* and the second protruding direction 500*h* can be divergent (i.e. not aligned) in some cases. The plurality of protrusions 500*e*, 500*f* are generally flexible to avoid damaging the foliage 30*d* and to mimic human fingers. Aiming this objective, in some embodiments, at least a portion 500*j* (e.g. the tip) of the plurality of protrusions 500*e*, 500*f* is coated with a soft and resilient material, such as a polymeric material (e.g. rubber) or a foam material. In some embodiments, the plurality of protrusions 500*e*, 500*f* are made of non-metallic material, such as, but without being limited to, a composite material including polyethylene terephthalate glycol and carbon fiber. Other materials are contemplated as well, such as metallic material (e.g. steel, aluminum, metallic alloys, plastic, etc.).

The gripper 500 further comprises a gripper actuating means 500*k* operated by the controller 700 and operatively connected to at least one of the first and second members 500*a*, 500*b*, and is configured to move the at least one of the first and second members 500*a*, 500*b* relative to the gripper center transversal plane 500T from an opened position 500*m* such that the gap 500*i* is maximal to a closed position 500*n* such that the gap 500*i* is minimal and adapted to pick up the plants 30 by their foliage 30*d*. In some embodiments, the gripper actuating means 500*k* is configured to move both the first and second members 500a, 500b relative to the gripper center transversal plane 500T, in a substantially symmetrical fashion.

In present technology, the gripper actuating means 500k is a pneumatic actuator, but other configurations are contemplated as well.

In addition, at least one of the opened position 500m and the closed position 500n of the gripper actuating means 500k is adjustable for picking up a specific type of plant 30. In other words, the gap 500i can be adjusted in order to be able to pick plants 30 having a larger or smaller foliage 30d, or the gap 500i can be adjusted in order to increase or decrease the clamping force applied by the plurality of protrusions 500e, 500f to the foliage 30d, for instance.

Since the gripper 500 is configured to pick up plants 30 by their foliage 30d, it is understood that plants 30 without foliage (i.e. dead plants, immature plants, non-viable plants) are left in the multi-celled tray 20, ensuring that the transplanter 10 is fed only with plants 30 with foliage (i.e. viable plants). This ensures a productive transplanting process and increases the overall efficiency of the plantation. It is understood that the gripper 500 can be "completely loaded" (i.e. every gap 500i between each of the plurality of protrusions 500e, 500f is filled by a plant 30) or "partially loaded" (i.e. at least one gap 500i between each of the plurality of protrusions 500e, 500f is not filled by a plant 30).

As shown on FIG. 6, the second portion 400b of the pick up means 400 is configured to selectively move the gripper 500 in a transversal direction 400f parallel to the transversal center plane 100T, operated by at least one actuator 400d including a second actuator 400g operated by the controller 700. Other configurations are contemplated as well. The transversal movement of the gripper 500 relative to the body 220 can be particularly useful for adjusting the transversal position of the gripper 500 relative to the multi-celled tray 20 and thus ensuring an adequate alignment between those two i.e. the plurality of protrusions 500e, 500f being aligned with the cells 20n of the multi-celled tray 20, or for allowing the gripper 500 to pick up every the plants 30 from the multi-celled tray 20 when said multi-celled tray 20 is larger than the gripper 500, i.e. when the multi-celled tray 20 comprises more columns 20c of cells than the amount of protrusions of the plurality of protrusions 500e, 500f of the gripper 500.

In addition, the second portion 400b of the pick up means 400 is configured to selectively rotate the gripper 500 about a second pivot axis 400h and operated by at least one actuator 400d including a third actuator 400i operated by the controller 700. Other configurations are contemplated as well. The rotational movement of the gripper 500 relative to the body 220 can be particularly useful for adjusting the relative angle between the gripper 500 and the multi-celled tray 200, in order to allow the plurality of protrusions 500e, 500f to adequately pick up the foliage 30d of the plants 30, in some cases.

In some embodiments, the second portion 400b of the pick up means 400 is configured to selectively move the gripper 500 in a longitudinal direction 400m parallel to the longitudinal center plane 100L, operated by at least one actuator 400d including a fourth actuator (not shown) operated by the controller 700. Other configurations are contemplated as well, such as, but without being limited to, a combination of the rotational movement of the pick up means 400 about the first pivot axis 400c and the rotational movement of the gripper 500 about the second pivot axis 400h. The longitudinal movement of the gripper 500 relative to the body 220 can be particularly useful for adjusting the longitudinal position of the gripper 500 relative to the multi-celled tray 20, in order to allow the plurality of protrusions 500e, 500f to adequately pick up the foliage 30d of the plants 30, in some cases.

As shown on FIGS. 18-22, the described movements of the pick up means 400 (i.e. the movement of the first portion 400a relative to the body 220 and the movement of the gripper 500 relative to the second portion 400b) are operated by the controller 700 and form a trajectory 400l including at least one of a first position 400m where the gripper 500 is located in front of the multi-celled tray 20 and is ready to pick up the plants 30 from it (namely referenced as the "picking position"), a second position 400n where the gripper 500 is moved away from the multi-celled tray 20 to extract the picked plants 30 from it (namely referenced as the "extraction position"), a third position 400o where the gripper 500 is pivoted downwardly about the second pivot axis 400h to face the conveyor assembly 600 (namely referenced as the "transitional position"), and a fourth position 400p where the gripper 500 is aligned above some of the plurality of receptacles 670 and is ready to release the picked plants (namely referenced as the "dropping position").

In some embodiments, the controller 700 is integrated to the apparatus 100 and can be operated directly in situ through an interface 701 or any equivalent interface. In some embodiments, the controller 700 is remotely operated, via a wireless transmission system 702 known in the art.

In some cases, the pick up means 400 moves stepwise along the first direction 100a in accordance to a predetermined pattern or routine depending on the type of plants 30 to be picked and their foliage 30d. For example, when the foliage 30d of the plants 30 to be picked is very dense (i.e. with a lot of leaves 30c and/or with big leaves 30c, etc.), the pick up means 400 can be operated such that the gripper 500 moves at least one step upwardly or downwardly before moving back to its picking position in order to move the leaves 30c away from the stem 30b of the plant 30, and avoiding said leaves 30c to be gripped and damaged.

Figure 17A:
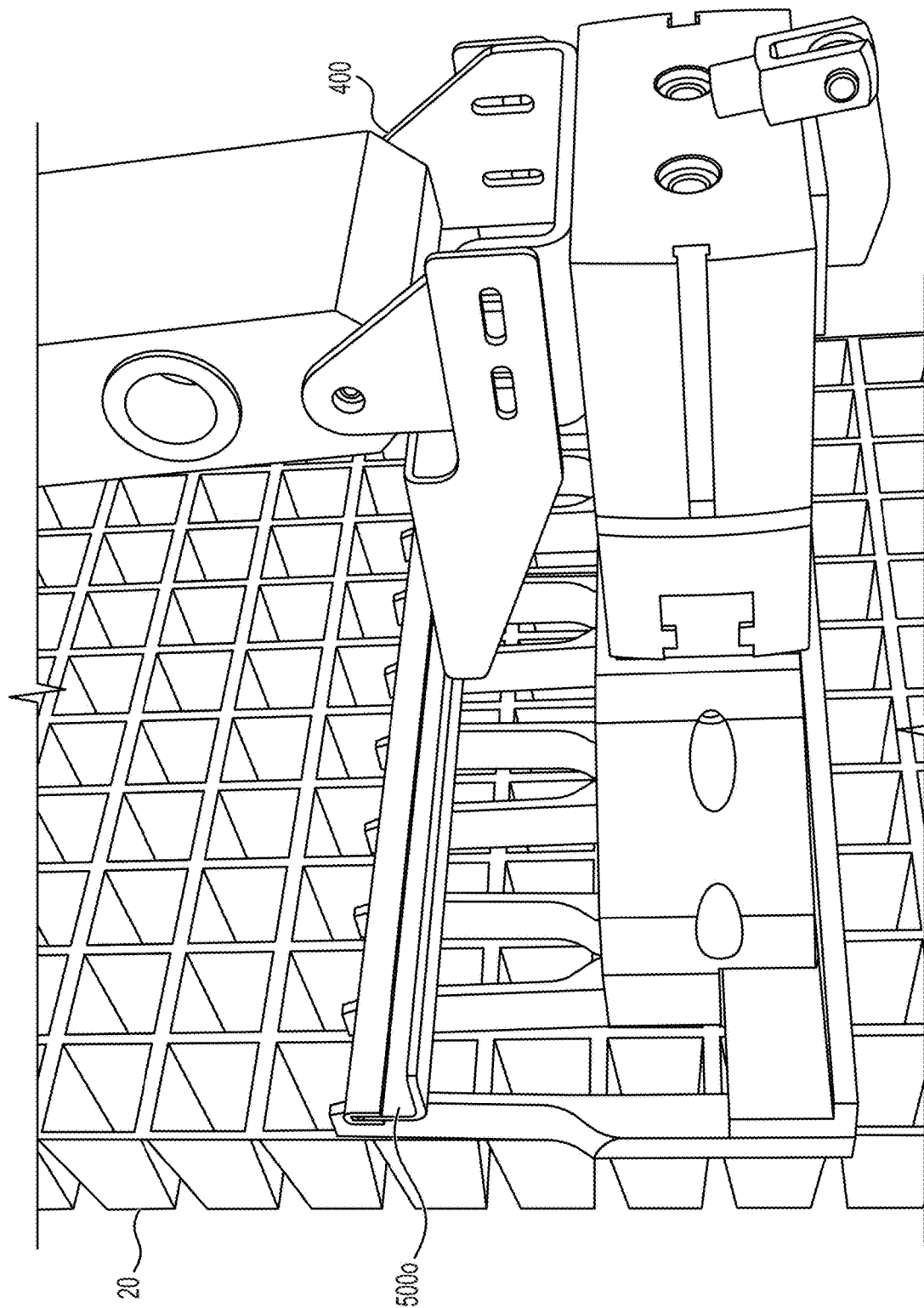
FIG. 17A is a close-up, perspective view taken from a bottom, front, left side of the apparatus of FIG. 6, showing only the pick up means, the multi-celled tray and the deflector.
Figure 17B:
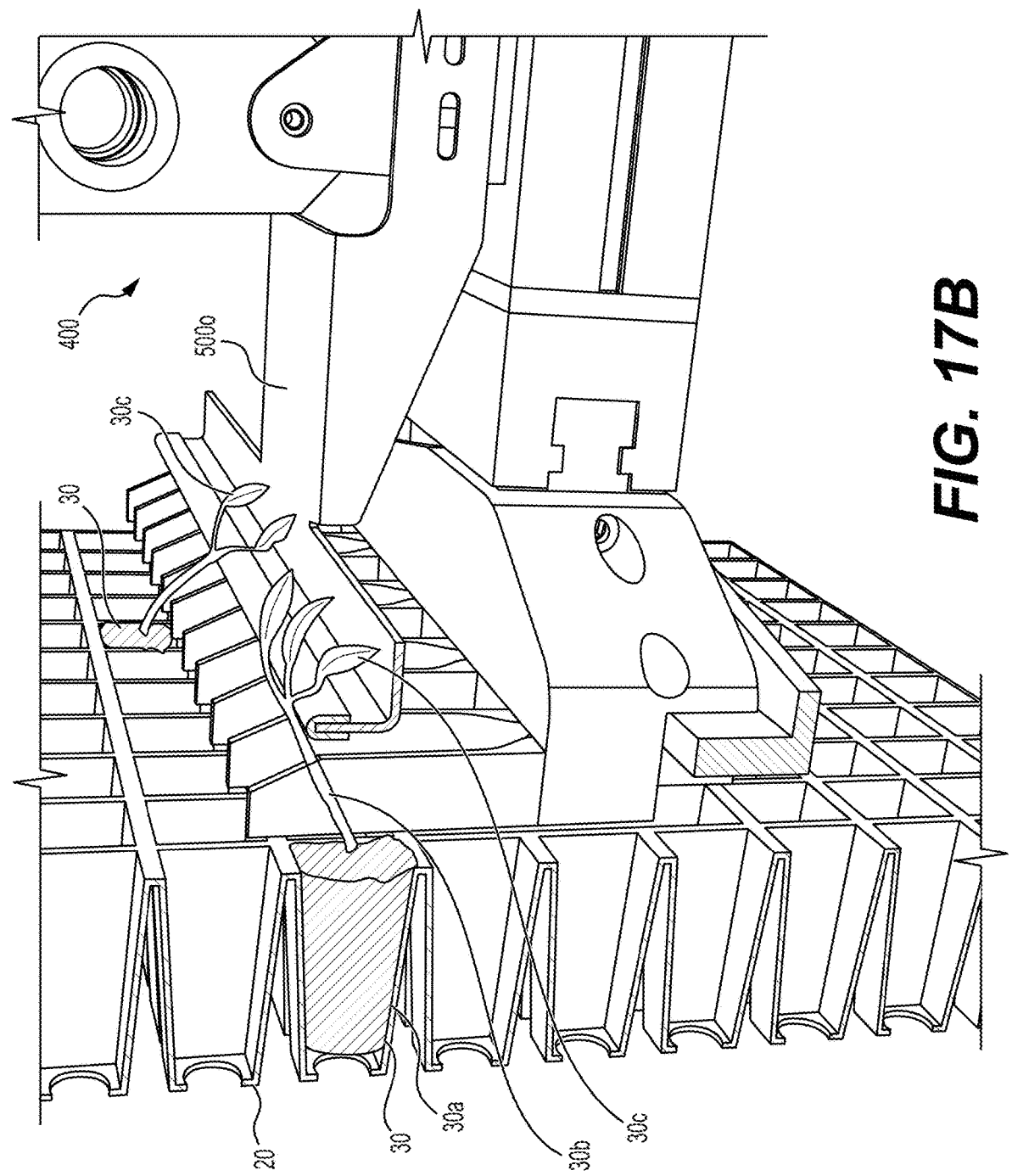
FIG. 17B is a close-up, sectional, perspective view taken from a top front, left side of the apparatus of FIG. 17A, showing a plant.
Figure 18:
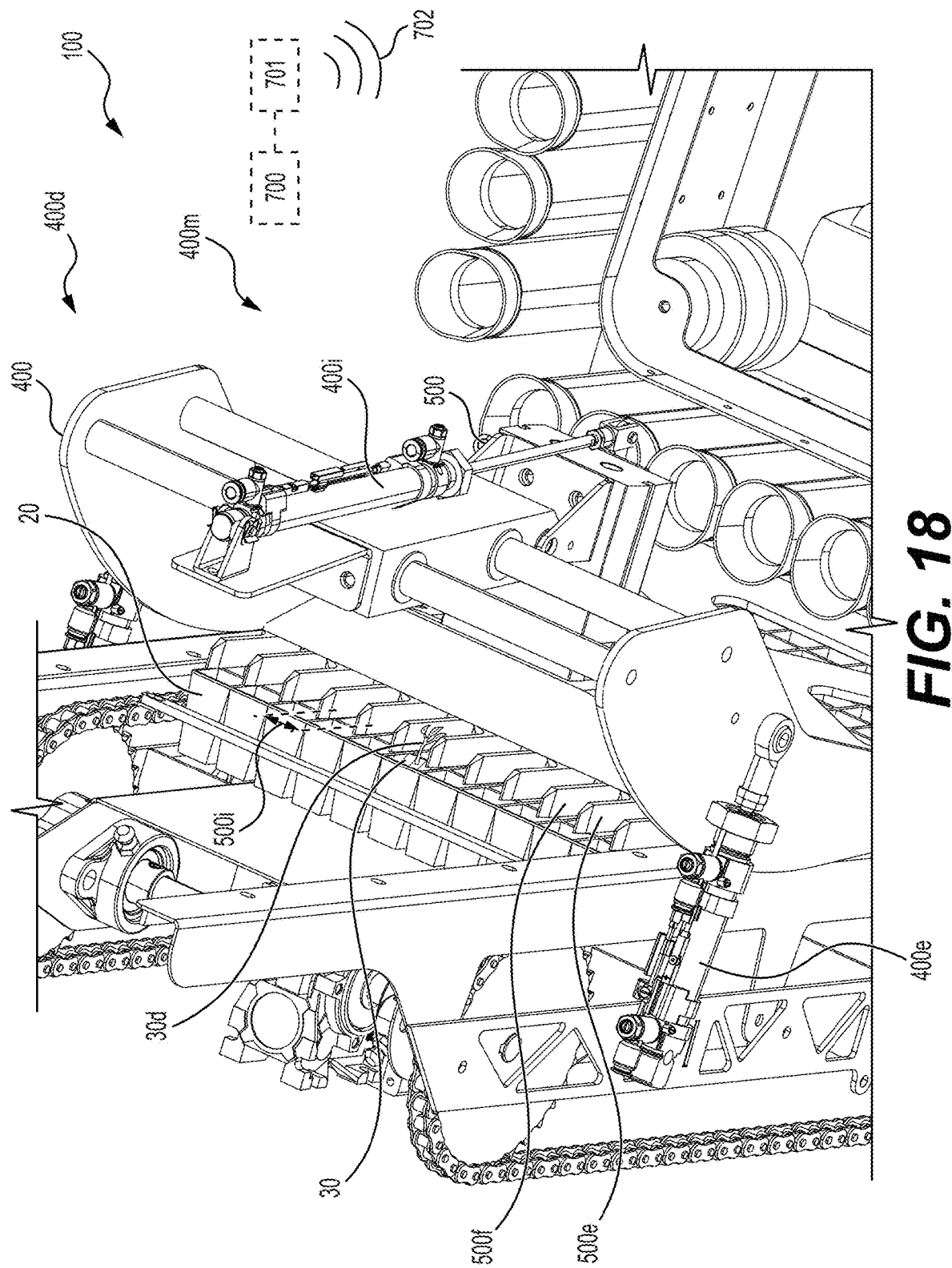
FIG. 18 is a close-up, perspective view taken from a top, front, right side of the apparatus of FIG. 6 in a first position.
Figure 19:
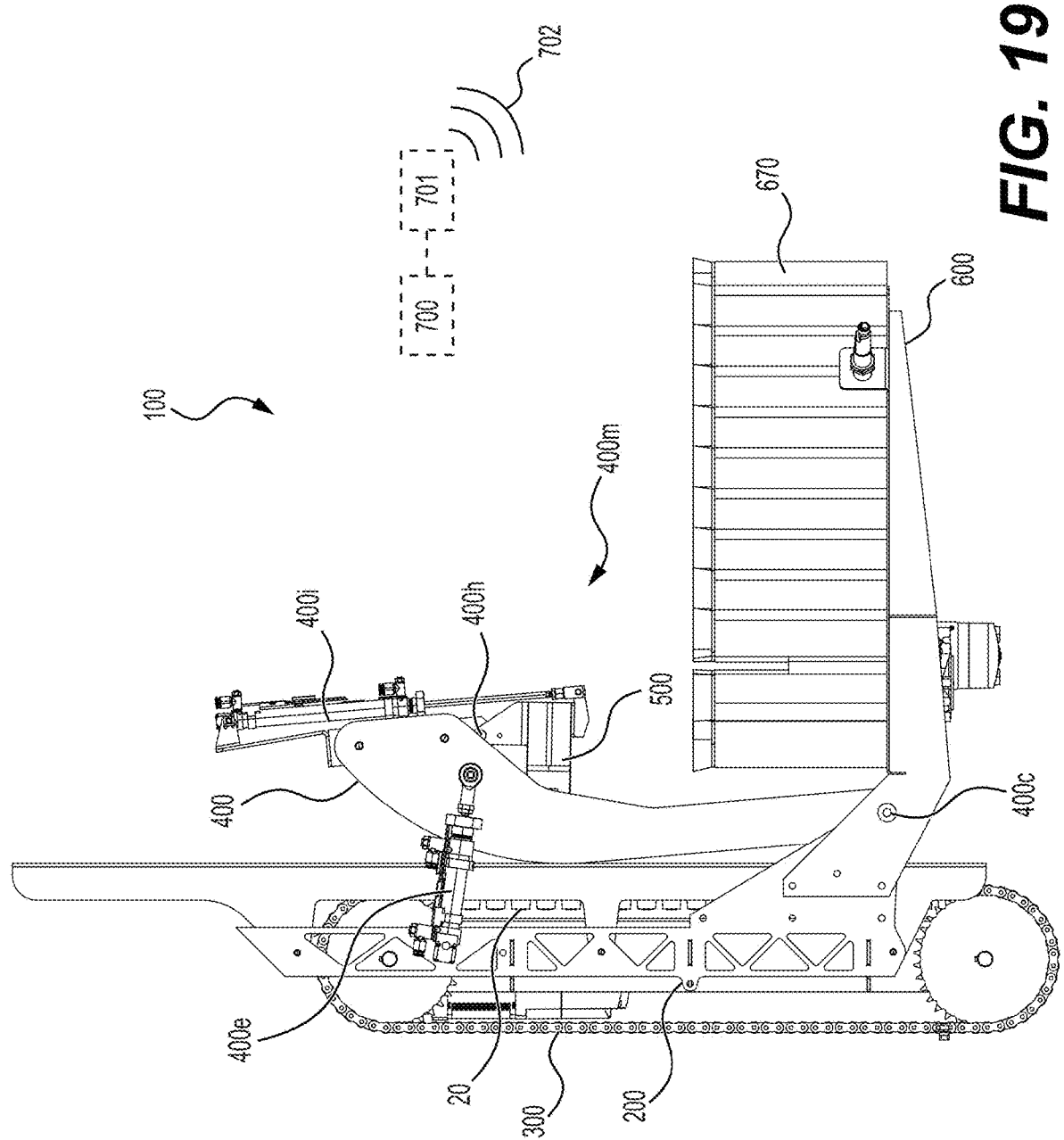
FIG. 19 is a right side elevation of the apparatus of FIG. 18.
Figure 20:
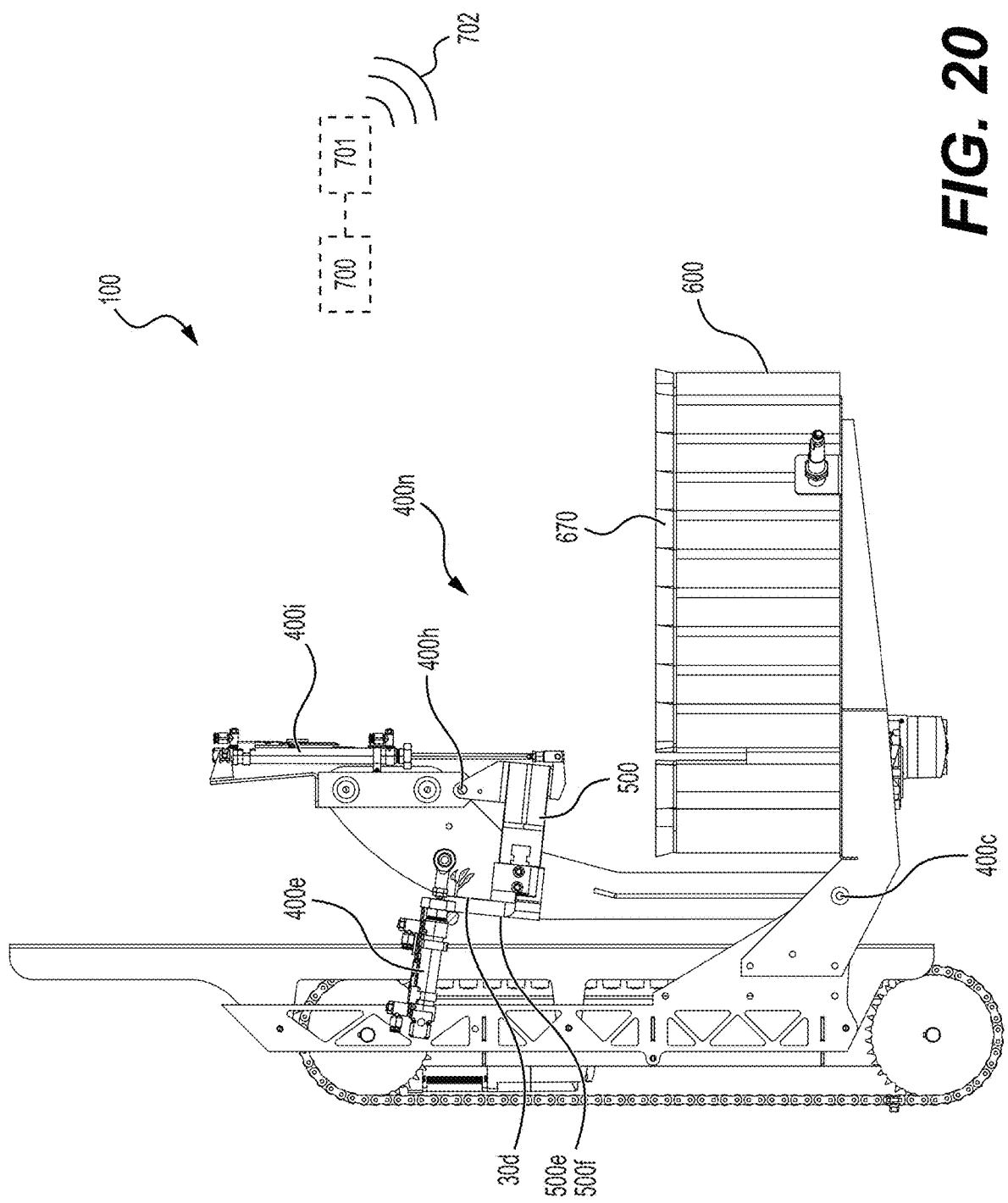
FIG. 20 is a right side elevation of the apparatus of FIG. 6 in a second position.
Figure 21:
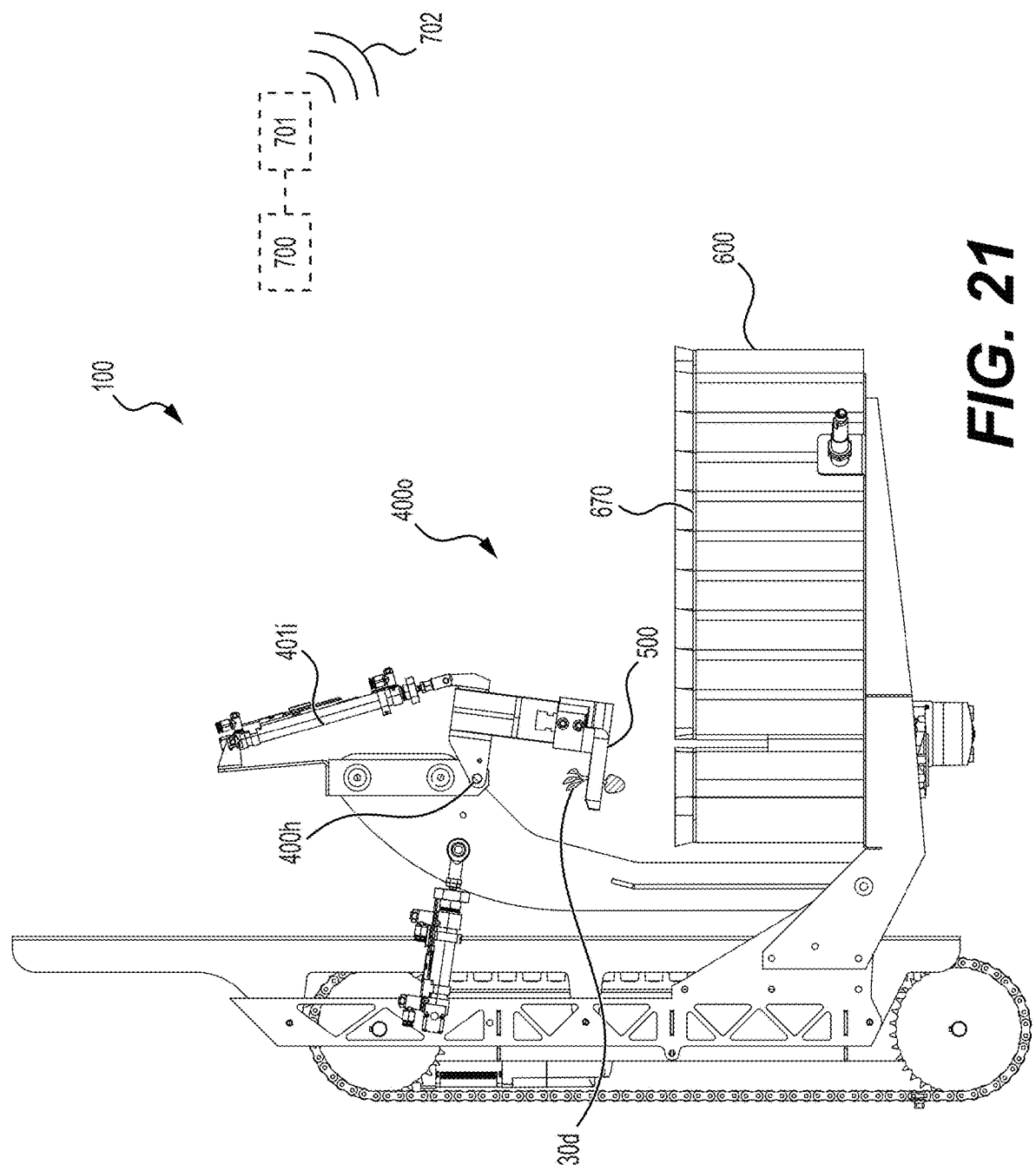
FIG. 21 is a right side elevation of the apparatus of FIG. 6 in a third position.
Figure 22:
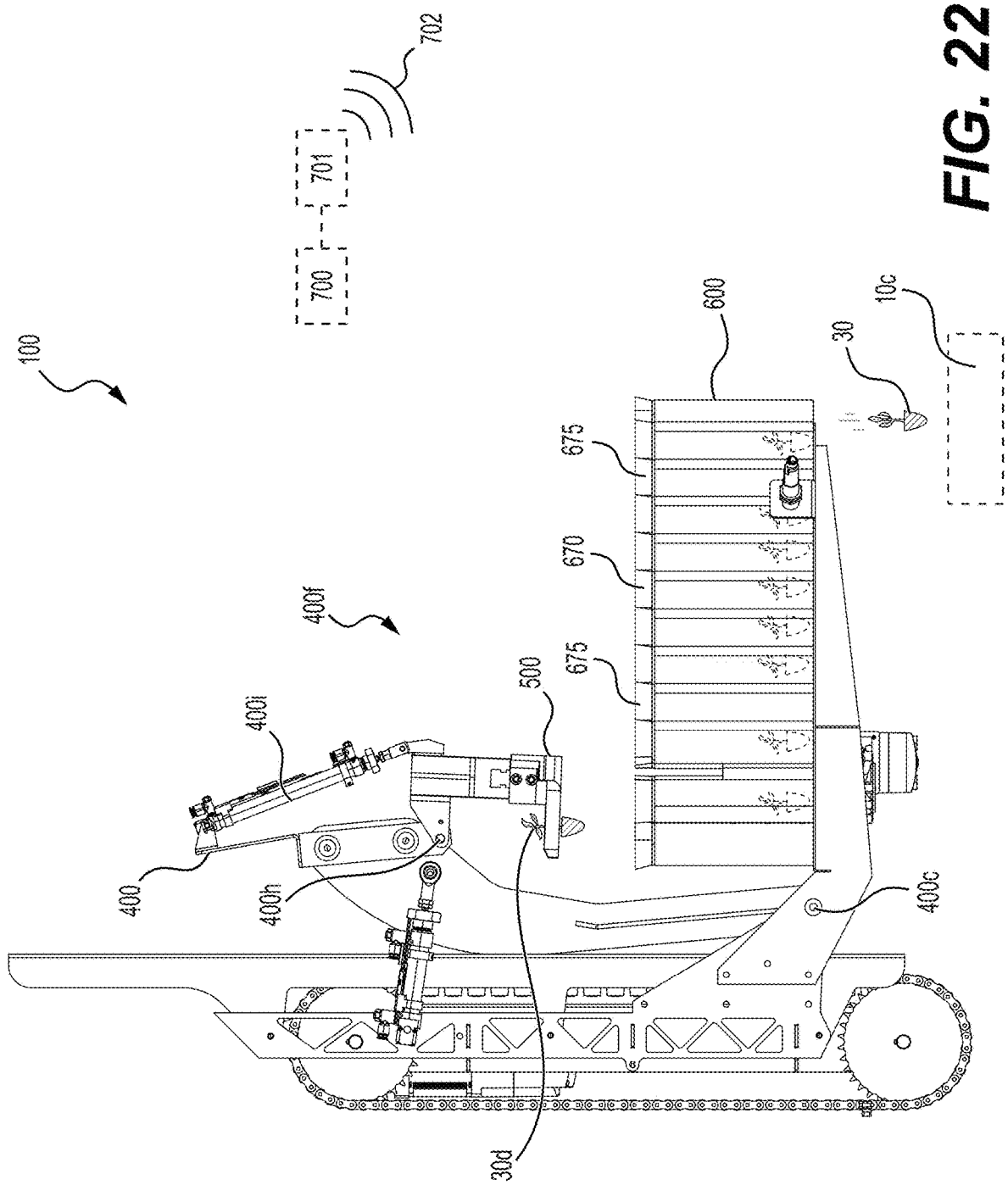
FIG. 22 is a right side elevation of the apparatus of FIG. 6 in a fourth position.
Figure 23:
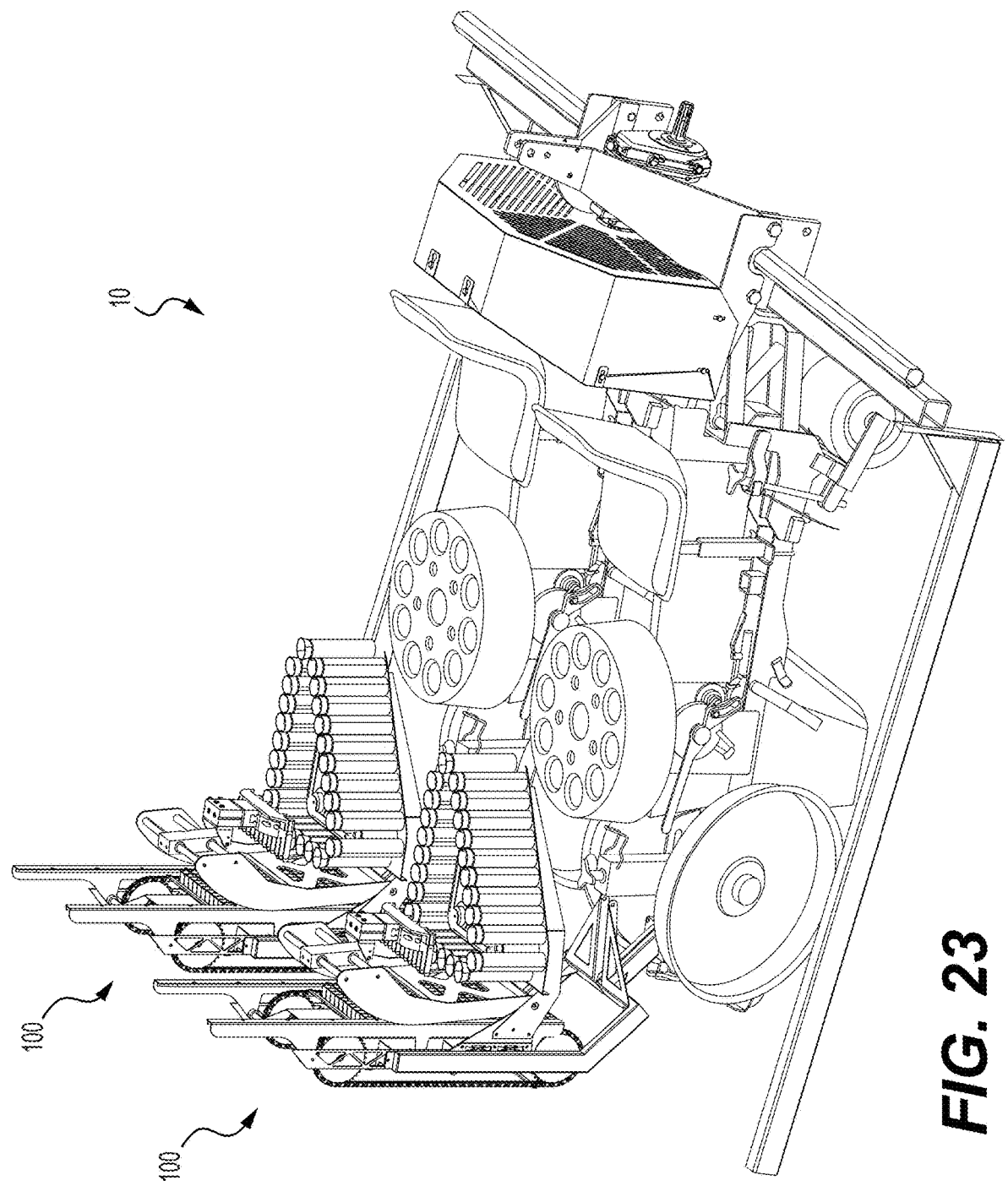
FIG. 23 is a perspective view taken from a top, front, right side of a transplanter with two apparatuses side-by-side.
Figure 24:
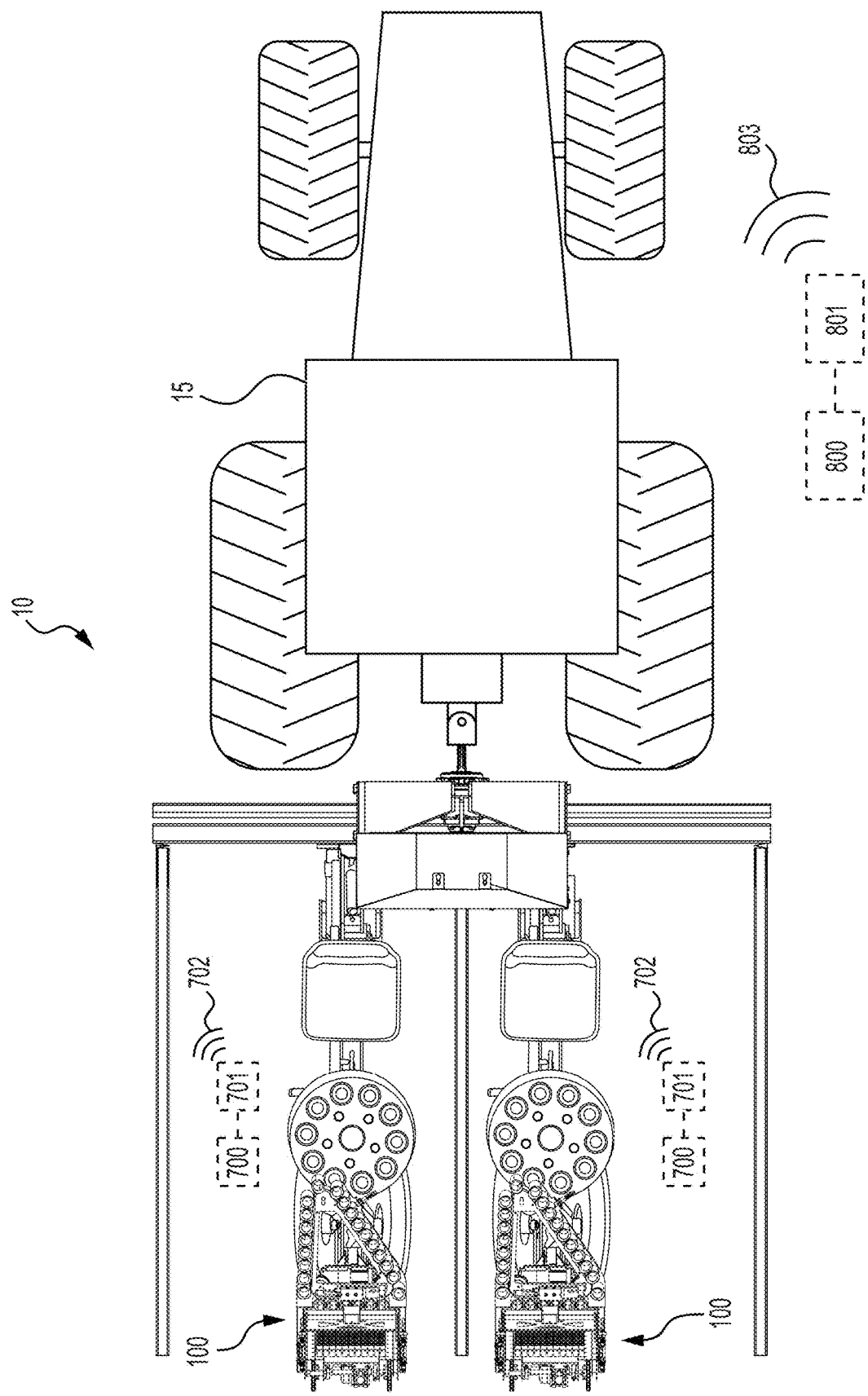
FIG. 24 is a top view of the transplanter of FIG. 23, towed by an agricultural vehicle.

In some embodiments, the pick up means includes a deflector 500o for moving the leaves of the plants from the stem of the foliage to facilitate the picking operation, as shown of FIGS. 17A-17B.

In some embodiments, the pick up means 400 is replaced at least partially by a robotic arm connected to the body 240 and connected to the gripper 500, or including said gripper 500 or any equivalent gripping mechanism for picking up the plants 30 from the multi-celled tray 20.

Conveyor Assembly

As shown on FIG. 6, the conveyor assembly 600 is located at the lower portion 200b of the support frame 200 and below the gripper 500, connected to the body 240, oriented along a second direction 100b transversal the first direction 100a, and comprises an endless belt 640 including a plurality of receptacles 670 connected to the endless belt 640, each receptacle of the plurality of receptacles 670 being configured to receive one plant 30, and at least one sensor 680 for detecting empty receptacles among the plurality of receptacles 670.

More particularly, the conveyor assembly 600 comprises a conveyor base 610, a driving roller 620, at least one idler roller 630, the driving roller 620 and each of the at least one idler roller 630 being spaced from each other, an endless belt 640 having an inner side 640a facing and wrapping around the driving roller 620 and the at least one idler roller 630 and configured to be driven by the driving roller 620, and an outer side 640b opposite the inner side 640a, a tensioner 650 configured to bias the endless belt 640 to modulate the tension induced to the endless belt 640, and a conveyor motor 660 configured to operatively drive the driving roller 620.

The conveyor assembly 600 is preferably fastened to the body 240, i.e. allowing a removable connection between said conveyor assembly 600 and body 240, in order to advantageously allow removal of the conveyor assembly 600 from the body 240 if required for maintenance, troubleshooting, or replacement by example. Other configurations are contemplated as well.

The conveyor base 610 is configured to support the components of the endless belt assembly including the driving roller 620, the at least one idler roller 630, and the endless track 640, and to maintain their relative position. The conveyor base 610 comprises a planar portion 610a on which the driving roller 620 and the at least one idler roller 630 are installed and a connecting portion 610b configured to connect to the body 240 of the support frame 200, typically via a plurality of mounting holes 610c.

The driving roller 620 is operatively connected to the conveyor motor 660 and configured to drivingly engage the endless belt 640 by frictional contact between the outer surface 620a of the driving roller 620 and the inner side 640a of the endless belt 640. In some embodiments, the driving roller 620 is a sprocket, whose teeth mechanically engage with the inner side 640a of the endless belt 640 via a plurality of cavities or apertures equally spaced along the inner side 640a of the endless belt 640.

Figure 12:
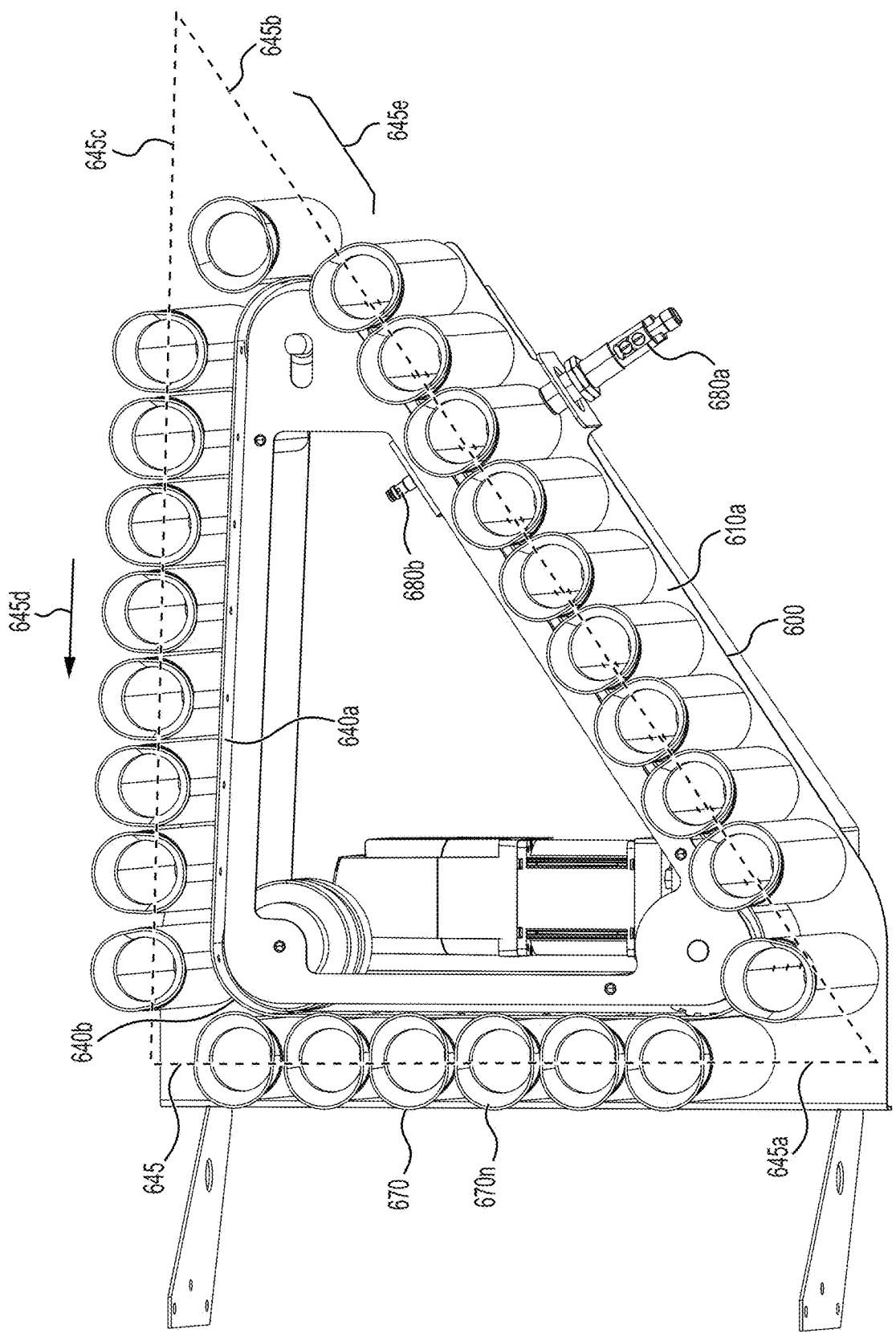
FIG. 12 is a perspective view taken from a top, front, right side of the conveyor assembly of the apparatus of FIG. 6.
Figure 13:
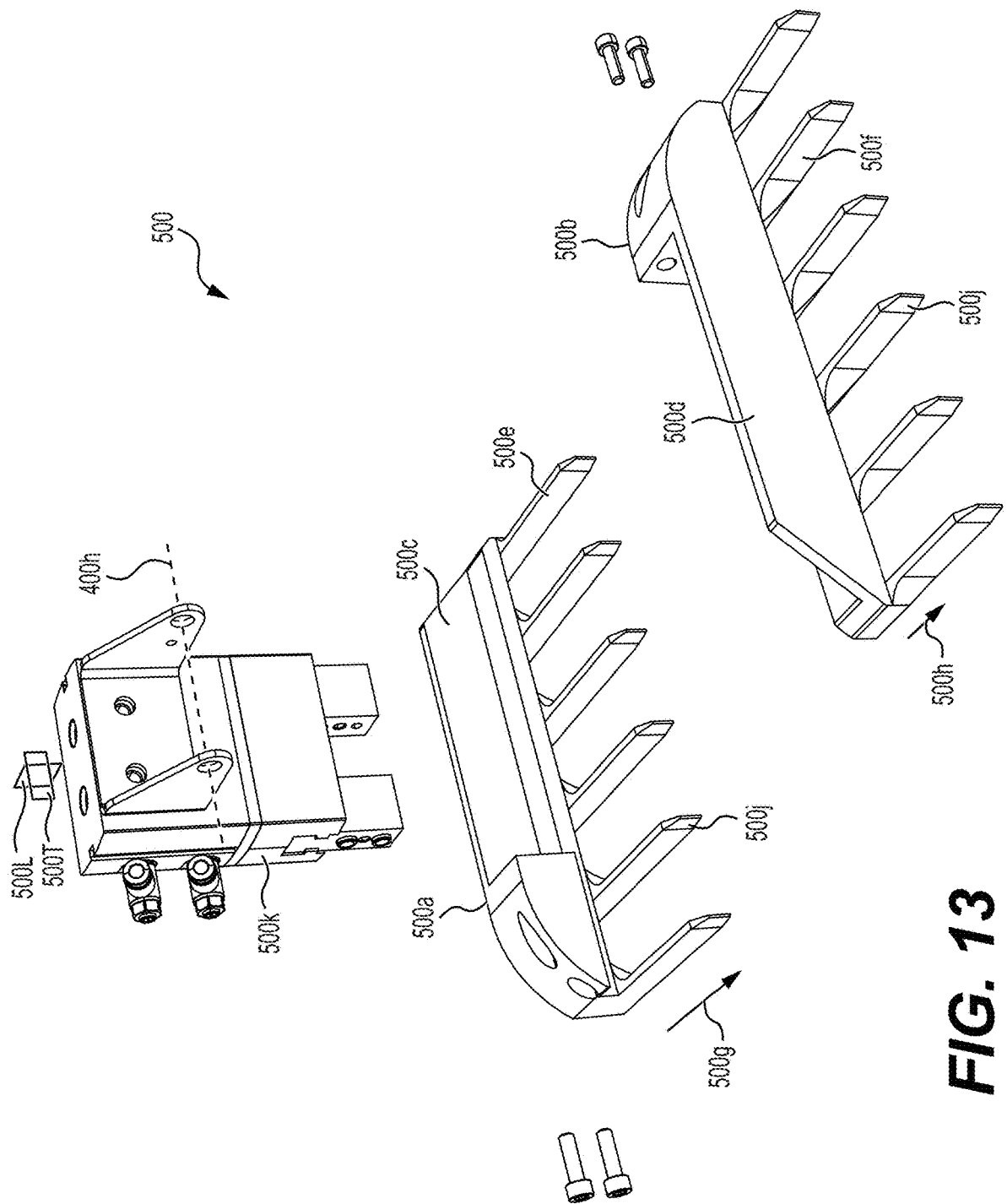
FIG. 13 is a partially exploded, perspective view taken from a top, front, right side of the gripper of the apparatus of FIG. 6.
Figure 14:
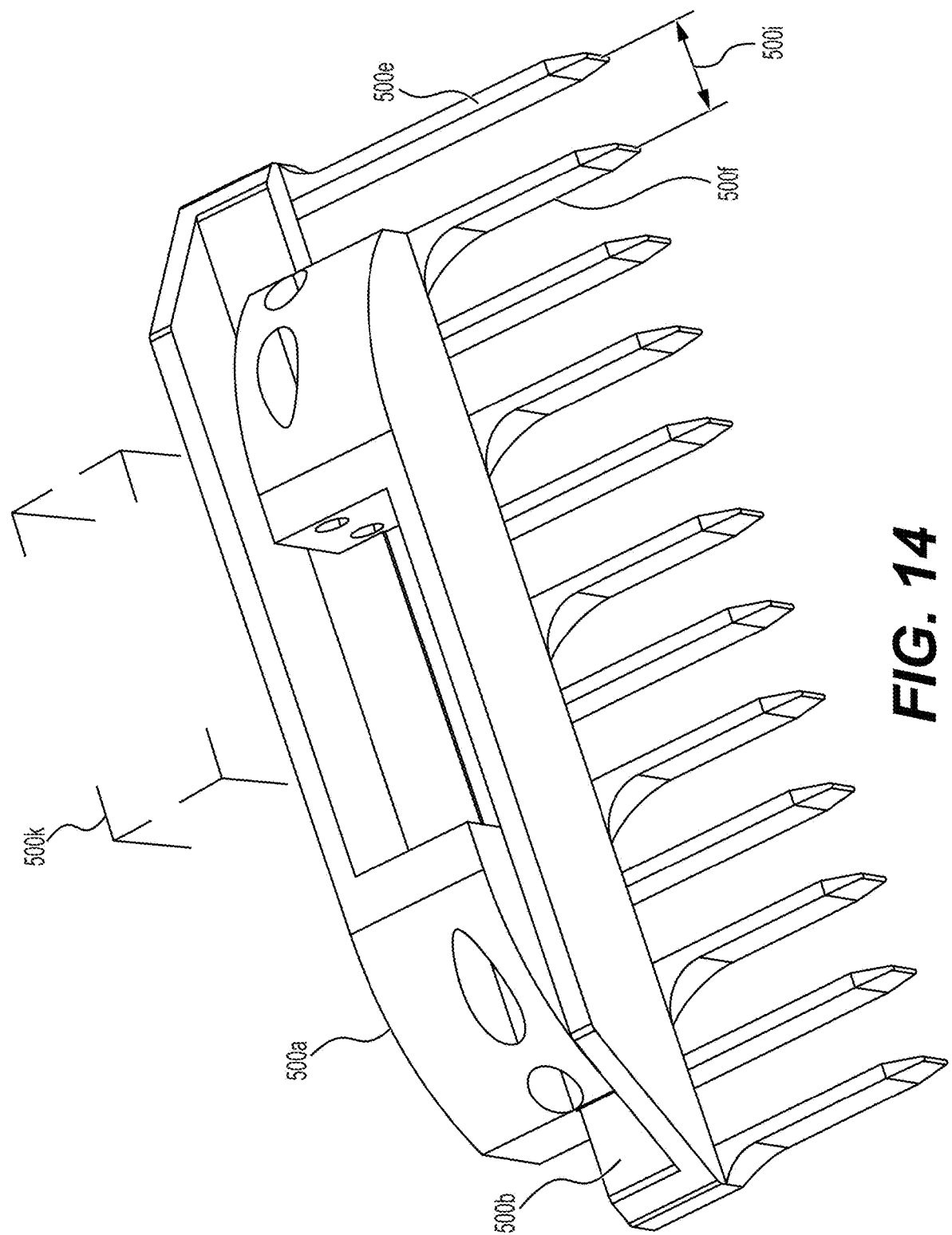
FIG. 14 is a perspective view taken from a top, front, right side of the first and second members of the gripper of FIG. 13.
Figure 16A:
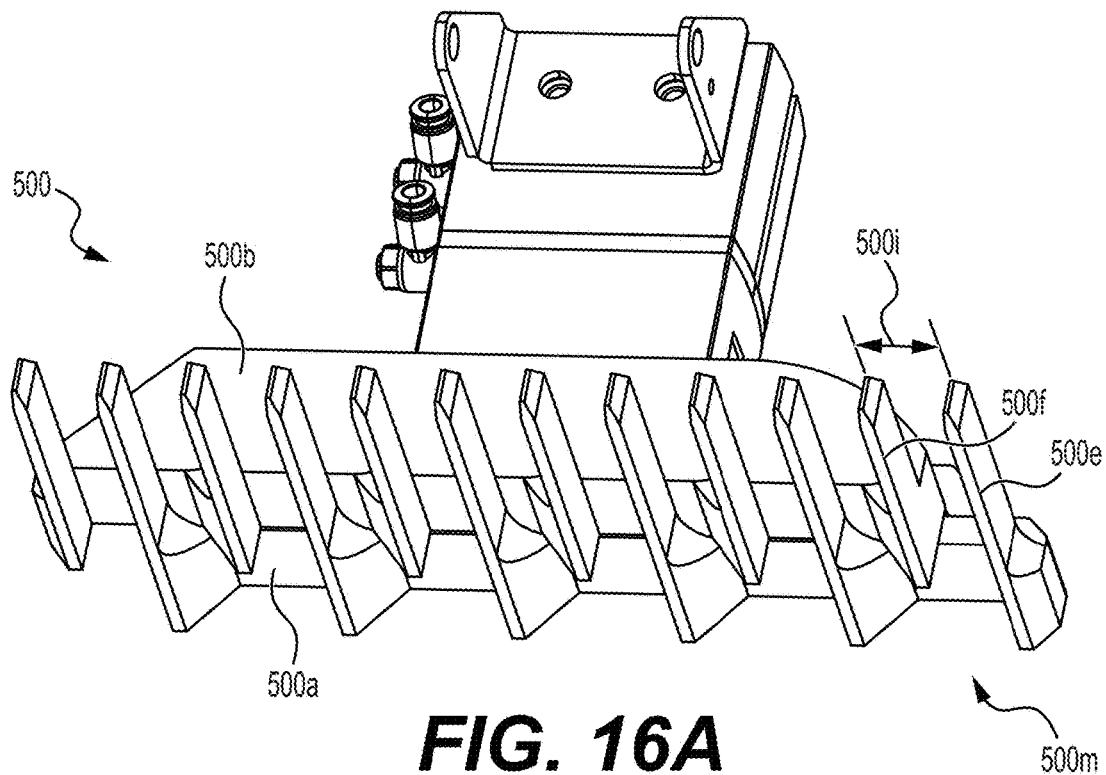
FIG. 16A/B is a perspective view taken from a bottom, front, left side of the gripper of FIG. 13 in opened position/closed position.
Figure 16B:
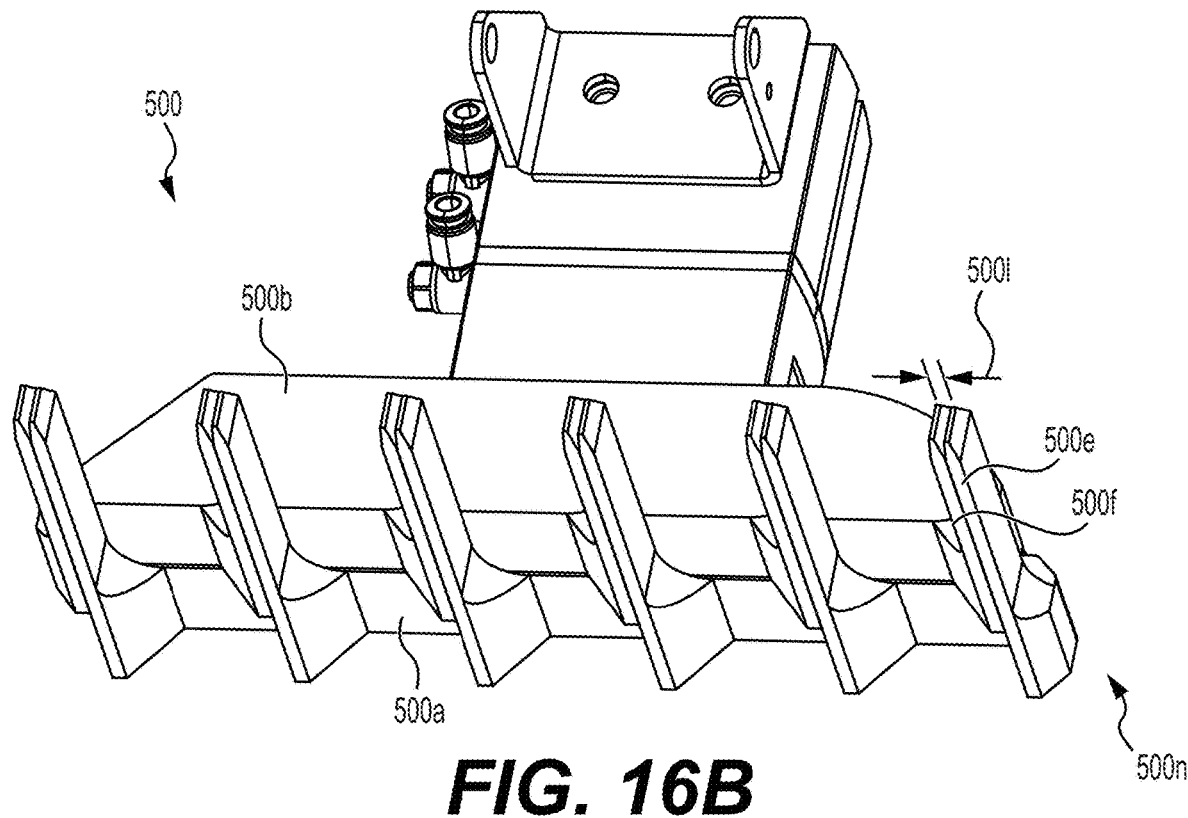

Each of the at least one idler roller 630 is freely rotating about an axis and located at a specific location on the conveyor base 610 and, with the driving roller 620, define a polygonal trajectory 645 of the endless belt 640, as shown on FIG. 12. In the present technology, the polygonal trajectory 645 is shaped like a triangle comprising a receiving segment 645a substantially parallel to the gripper transversal center 500T, a delivering segment 645b extending generally toward the plant dropping means 400, and a returning segment 645c extending generally toward the apparatus 100, but could be differently shaped and sized, depending of the available room to fit it on the transplanter 10. Moreover, the polygonal trajectory 645 defines a drop zone 645e sized to comprise one receptacle 670n at the time, and configured to allow said receptacle 670n to drop the plant 30 it contains, as shown on FIG. 22. In some embodiments, the drop zone 645e is substantially disposed above the plant dropping means 10c, such that each plant 30 are sequentially transferred from each receptacle 670n of the plurality of receptacles 670 to the plant dropping means 10c. In the present technology, the conveyor base 610 further includes a cutout 610d through which the plants 30 pass to get out from the receptacle 670n. Other configurations are contemplated as well.

Each receptacle 670n of the plurality of receptacles 670 is hollow and is substantially adjacent to each other, connected to the outer side 640b of the endless belt 640 without significantly impairing the flexibility of the endless belt 640, and is configured to receive one plant 30 from the gripper. Each receptacle 670n of the plurality of receptacles 670 being hollow, the receptacles 670n temporarily contain one plant 30 (the conveyor base 610 serving as a bottom retaining said plant 30) until the receptacles 670n reach the drop zone 645d, where the plant 30 falls into the plant dropping means 10c. More particularly, each receptacle 670n of the plurality of receptacles 670 is sized and shaped in order to temporarily contain a specific type of plant 30 without damaging it and to match the width of the gripper 500. In other words, each receptacle 670n of the plurality of receptacles 670 being adjacent to each other, the distance between the center of two adjacent receptacles 670n (namely referenced as "receptacle pitch") has to be substantially equal to the distance between two adjacent protrusions 500e, 500f of the gripper 500 (namely referenced as "gripper pitch") in order to make sure that every plant 30 dropped from the gripper 500 is received by one receptacle 670n. It is understood that both the gripper 500 and the plurality of receptacles 670 have to be provided and configured as a collaborative pair for a given specific type of plant 30 to be transplanted. The same principle applies to the polygonal trajectory 645; especially to the receiving segment 645a which has to be sized to ensure that the amount of receptacles 670n comprised along said receiving segment 645a matches the amount of protrusions 500e, 500f of the gripper 500, i.e. the amount of receptacles 670n parallel to the gripper 500 has to be equal to the amount of plants 30 of be dropped by said gripper 500.

As mentioned, the conveyor assembly 600 further comprises a plurality of sensors 680, including at least one plant sensor 680a configured for detecting empty receptacles 675, due to situations when the gripper 500 is "partially loaded". When these empty receptacles 675 pass in front of the at least one plant sensor 680a, the at least one plant sensor 680a registers the relative position of said empty receptacle 675 among the plurality of receptacles 670. For example, if the amount of plurality of receptacles is 10, then each receptacle 670n is identified by a unique ID (e.g. receptacle #1, receptacle #2, receptacle #n, ( . . . ), receptacle #10) and if receptacles #3 and receptacle #7 are empty, the plant sensor 680a registers that the receptacle #3 and the receptacle #7 do not contain one plant 30. The data is then transmitted to the controller 700, as it will further be described. The plant sensor 680a can be any known sensor configured to detect an object, such as but without being limited to an inductive sensor, a proximity switch, an infrared sensor, a laser sensor, an electromechanical limit switch, a magnetic sensor, a photoelectric sensor, an ultrasonic sensor, etc. Other configurations are contemplated to detect the presence or absence of plant 30 in each of the plurality of receptacles 670.

In some embodiments, the plurality of sensors 680 further includes a home sensor 680b configured to detect a specific receptacle 670n of the plurality of receptacles 670 (ex: receptacle #1) to calibrate the conveyor assembly 600. In some embodiments, the home sensor 680b collaborates with the conveyor motor 660, when said conveyor motor 660 is a servo-motor having a built-in encoder. The data is then transmitted to the controller 700, as it will further be described. The home sensor 680b can be any known sensor configured to detect an object, such as but without being limited to a capacitive sensor, a proximity switch, an infrared sensor, a laser sensor, an electromechanical limit switch, a magnetic sensor, a photoelectric sensor, an ultrasonic sensor, etc.

Operation

In operation, the apparatus 100 is configured for continuously feeding the plant dropping means 10c of the transplanter 10.

More particularly, prior using the apparatus 100, the gripper 500 is configured to adequately pick up the specific type of plant 30 to be transplanted, including selecting and installing first and second members 500a, 500b having a determined amount of protrusions 500e, 500f with a determined rigidity and spacing ("gripper pitch"), setting the minimum and maximum values of the gap 500i and thus the clamping force generated by the gripper 500 on the foliage 30*d* of the plant 30, etc. In addition, the conveyor assembly 400 is configured to adequately receive the plants 30 from the gripper 500, including selecting and installing the plurality of receptacles 670 on the endless track 640 in order to match with the "gripper pitch", configuring the polygonal trajectory 645 in order to have the receiving segment 645*a* congruent to the amount of plants 30 handled by the gripper 500, calibrating it using the home sensor 680*b* and the controller 700, etc. In addition, the support frame 200 is adjusted to accommodate the type of multi-celled tray 200 that will be used by adjusting the distance 200*m* between the first and second support members 220*f*, 220*g* for instance.

When the apparatus 100 is ready, the multi-celled tray 20 is placed on the support frame 200, abutting to the at least one guiding means 220*i* and secured on the tray actuation means 300. The tray actuation means 300 selectively moves the multi-celled tray 20 downward until a first row of cells 20*n* containing plants 30 is aligned with the plurality of protrusions 500*e*, 500*f* of the gripper 500, the gripper 500 being in the "picking position" (first position 400*m*). The gripper actuating means 500*k* moves at least one of the first and second members 500*a*, 500*b* such that the gap 500*i* therebetween is large enough for clearing at least a portion of the foliage 30*d* of the plants 30 (open position 500*m*, maximum gap). The pick up means 400 moves the gripper 500 toward the multi-celled tray 20 (first position 400*m*) by using at least one of the first, second, third, and fourth actuators 400*d*, before the gripper actuating means 500*k* moves at least one of the first and second members 500*a*, 500*b* such that the gap 500*i* therebetween is small enough for picking the foliage 30*d* of the plants 30 with the determined clamping force without damaging it (closed position 500*n*, minimum gap). At this moment, it is understood that the non-viable plants (i.e. plants without foliage 30*d*) are left in their respective cell 20*n* in the multi-celled tray 20, and only the viable plants (i.e. plant mature enough having a foliage 30*d*) are picked up by the gripper 500. As mentioned, in such case, the gripper 500 is said to be "partially loaded". The pick up means 400 moves the gripper 500 away from the multi-celled tray 20 and extracts the viable plants 30 from said multi-celled tray 20 ("extraction position", second position 400*n*), before rotating the gripper 500 to make it facing the conveyor assembly 600 ("transitional position", third position 400*o*) and finally moving the gripper 500 directly above the conveyor assembly 600 ("dropping position", fourth position 400*p*) by using at least one of the first, second, third, and fourth actuators 400*d*. Cooperatively, the conveyor assembly 600 is operated such that each receptacle 670*n* of the plurality of receptacles 670 comprised in the receiving segment 645*a* of the polygonal trajectory 645 is aligned with the plants 30 handled by the gripper 500. The gripper actuating means 500*k* moves at least one of the first and second members 500*a*, 500*b* such that the gap 500*i* therebetween is large enough for releasing the plants 30 (open position 500*m*, maximum gap), each of which falls into one receptacle 670*n* of the plurality of receptacles 670. The conveyor assembly 600 is then operated to roll the endless belt 640 such that each receptacle 670*n* comprised in the receiving segment 645*a* passes in front of the plant sensor 680*a* to detect which receptacles 670*n* do not contain one plant (i.e. empty receptacle 675), and such that the receiving segment 645*a* comprises a new batch of receptacles 670*n* ready to receive plants 30 from the gripper 500. Meanwhile, the pick up means 400 and the tray actuation means 300 repeat the described sequence to pick up a new row of plants 30 from the multi-celled tray 20. When the receptacles 670*n* initially comprised in the receiving segment 645*a* arrive near the drop zone 645*d*, the controller 700 selectively modulates the rotational speed of the conveyor motor 660 to accelerate momentarily the speed of the endless track 640 in order to skip empty receptacles 675 detected by the plant sensor 680*a* such that the plant dropping means 10*c* is continuously fed with plants 30. That way, the plantation is ensured to be maximized compared to having missing plants. After having passed an empty receptacle 675, the controller 700 selectively modulates the rotational speed of the conveyor motor 600 to the nominal speed synchronized with the planting speed 10*i* of the plant dropping means 10*c*. The described sequence is then repeated as required to ensure a continuous feeding of the transplanter 10 by the apparatus 100. The multi-celled tray 20, when empty, is discarded and replaced by another with plants 30, as required. It is understood that the described sequence can be altered without impairing the scope of the present technology.

It is understood that the controller 700 operates at least one of the tray actuation means 300, the pick up means 400, and the conveyor assembly 600 in a cooperative manner to skip empty receptacles 675 detected by the at least one sensor 680 and continuously feed the plant dropping means 10*c* of the transplanter 10 with viable plants 30 having a foliage 30*d*.

It is also understood that the cycle time for executing said sequence coincides with the planting speed 10*i*.

Method

In the present technology, a method is provided to continuously feed a transplanter 10 having a plant dropping means 10*c* with viable plants 30 having a foliage 30*d*. The method comprises providing a multi-celled tray 20 filled with a plurality of plants 30, picking up at least one of the plurality of plants 30 by its foliage 30*d* with a pick up means 400, transferring the at least one of the plurality of plants 30 to a conveyor assembly 600 having an endless belt 640 and a plurality of receptacles 670 connected to the endless belt 640, each receptacle 670*n* of the plurality of receptacles 670 being configured to receive one plant 30, detecting empty receptacles 675 (i.e. receptacles 670*n* among the plurality of receptacles 670 that did not received a plant 30 from the gripper 500) with at least one sensor 680; and operating the conveyor assembly 600 to skip empty receptacles 675 detected by the at least one sensor 680 and continuously feed the plant dropping means 10*c* with plants 30 having foliage 30*d*.

The described steps are performed cooperatively and operated by a controller 700, which comprises an interface 701. In some embodiments, the controller 700 is remotely operated by a wireless transmission system 702.

The nominal speed of the conveyor assembly 600 is synchronized by default with the plant dropping means 10*c* for ensuring the continuous feeding of said plant dropping means 10*c* at the planting speed 10*i*, and is selectively modified by the controller 700 in order to skip an empty receptacle 675 and re-established to its nominal speed for ensuring the continuous feeding of the plant dropping means 10*c* at the planting speed 10*i*. In the cases where the plant dropping means 10*c* is a carousel 10*j*, the conveyor assembly 600 is thus synchronized with the angular position of the carousel 10*j* for ensuring the continuous feeding of said carousel 10*j* at the planting speed 10*i*. It is understood that the cycle time for executing said method coincides with the planting speed 10*i*.

In some embodiments, the pick up means 400 comprises a gripper 500.

In some embodiments, the method further comprises additional steps related to the preparation of the apparatus 100 for a specific type of plant 30 or for a specific type of multi-celled tray 20, as mentioned above.

In some embodiments, the method further comprises additional steps related to the stepwise movements of at least one of the tray actuation means 300 and the pick up means 400 to move away the leaves 30*c* of plants 30 and facilitate picking said plants 30 by the gripper 500, as mentioned above.

Agricultural Vehicle

As mentioned, the apparatus 100 is especially configured to retrofit existing transplanters 10. This is achieved by the fact that the apparatus 100 is removably connectable to the transplanter 10, preferably fastened to the frame 10*a*, i.e. allowing a removable connection between said apparatus 100 and transplanter 10, in order to advantageously allow removal of the apparatus 100 from the transplanter 10 if required for maintenance, troubleshooting, or replacement by example. This removable connection also allow replacement of a faulty apparatus 100 by another apparatus 100, or by the old feeding device previously installed on the transplanter 10. In addition, in the case where the transplanter 10 comprises or requires multiple feeding devices, the retrofit of this transplanter 10 can be made progressively, i.e. replacing one feeding device by one apparatus 100 at the time, mitigating the costs and the risks of such retrofitting operation. The apparatus 100 can coexist with other types of feeding devices due to its compactness and to the fact that it is operated by its own controller 700. In addition, when multiple apparatus 100 are installed on the same transplanter as shown on FIG. 23, each controller 700 can be controlled by a master controller 800 which can coordinate the float of apparatus 100 in a cooperative manner, centralize the data processing, and ease the logistic by modifying the settings or parameters through only one interface 801 instead of multiple interfaces 701. In some embodiments, the master controller 800 is operated remotely via a wireless transmission system 802 known in the art. Other configurations are contemplated as well.

CONCLUSION

Modifications and improvements to the above-described embodiments of the present technology may become apparent to those skilled in the art. The foregoing description is intended to be exemplary rather than limiting. The scope of the present technology is therefore intended to be limited solely by the scope of the appended claims.

REFERENCE NUMERALS/ELEMENTS

- 10 Towed transplanter/Motorized Transplanter
  - 10*a* frame
  - 10*b* ground-engaging means
  - 10*c* plant dropping means
  - 10*d*/10*d'* propulsion means
  - 10*e*/10*e'* engine
  - 10*f*/10*f'* steering mechanism
  - 10*g*/10*g'* speed controlling means
  - 10*h*/10*h'* transplanter speed
  - 10*i*/10*i'* planting speed
  - 10*j* carousel
  - 10*k* rotational speed
  - 10*l* power source
  - 15 motorized machine
- 20 Multi-celled tray
  - 20*n* plurality of cells
  - 20*r* rows
  - 20*c* columns
  - 20*d* depth
  - 20*w* width
  - 20*l* length
  - 20*s* spacing
- 30 Plant
  - 30*a* root ball
  - 30*b* stem
  - 30*c* leaves
  - 30*d* foliage
- 100 Apparatus
  - 100L longitudinal center plane
  - 100T transversal center plane
  - 100*a* first direction
  - 100*b* second direction
  - 100*c* different direction
  - α angle
- 200 Support frame
  - 200*a* upper portion
  - 200*b* lower portion
  - 210 base
    - 210*a* interface portion
    - 210*b* extension
  - 220 Body
    - 220*a* top portion
    - 220*b* front portion
    - 220*c* back portion
    - 220*d* left side portion
    - 220*e* right side portion
    - 220*f* first support member
    - 220*g* second support member
    - 220*h* transverse member
    - 220*i* guiding means
    - 220*j* guiding surface
    - 220*k* first guiding means
    - 220*l* second guiding means
    - 220*m* distance
- 300 Tray actuation means
  - 300*a* mechanical device
  - 300*b* stopper
- 400 Pickup means
  - 400*a* first portion
  - 400*b* second portion
  - 400*c* first pivot axis
  - 400*d* at least one actuator
  - 400*e* first actuator
  - 400*f* transversal direction
  - 400*g* second actuator
  - 400*h* second pivot axis
  - 400*i* third actuator
  - 400*j* longitudinal direction
  - 400*k* fourth actuator
  - 400*l* trajectory
  - 400*m* first position
  - 400*n* second position
  - 400*o* third position
  - 400*p* fourth position
- 500 Gripper
  - 500L gripper longitudinal center plane
  - 500T gripper transversal center plane
  - 500*a* first member
  - 500*b* second member
  - 500*c* first member body
  - 500*d* second member body 500e first plurality of protrusions
500f second plurality of protrusions
500g first protruding direction
500h second protruding direction
500i gap
500j portion
500k gripper actuating means
500m open position
500n closed position
500o deflector
600 Conveyor assembly
  610 conveyor base
    610a planar portion
    610b connecting portion
    610c plurality of mounting holes
    610d cutout
  620 driving roller
    620a outer surface
  630 idler roller
  640 endless belt
    640a Inner side
    640b Outer side
  645 polygonal trajectory
    645a receiving segment
    645b delivering segment
    645c returning segment
    645d trajectory direction
    645e drop zone
  650 tensioner
  660 conveyor motor
  670 plurality of receptacles
    670n receptacle
    675 empty receptacle
  680 sensor
    680a plant sensor
    680b home sensor
700 Controller
  701 interface (GUI)
  702 wireless transmission system
800 Master Controller
  801 interface (GUI)
  802 wireless transmission system

The invention claimed is:

1. An apparatus for feeding a transplanter of plants from a multi-celled tray, the multi-celled tray comprising cells each having a plant and forming at least one row of plants, the transplanter comprising a frame and a plant dropping means connected to the frame, and defining a planting speed, and the apparatus comprising:

a support frame including a base connectable to the frame of the transplanter, a body extending from the base along a first direction, and defining an upper portion and a lower portion;

a tray actuation means connected to the body, and configured to selectively move the multi-celled tray along the first direction;

a pick up means including a first portion pivotally connected to the body, a second portion spaced from the first portion, and a gripper selectively movably connected to the second portion;

a conveyor assembly located at the lower portion of the support frame and below the gripper, connected to the body, oriented along a second direction transversal to the first direction, having an endless belt, a plurality of receptacles connected to the endless belt, each of the plurality of receptacles being configured to receive one plant, and at least one sensor for detecting empty receptacles;

wherein the gripper picks up the plants of the at least one row of plants by their foliage such that the plants without foliage are left in the multi-celled tray; and wherein the tray actuation means, the pick up means, and the conveyor assembly operate in a cooperative manner to skip empty receptacles detected by the at least one sensor and continuously feed the plant dropping means with plants with foliage.

2. The apparatus of claim 1, wherein the first direction is substantially normal to the frame of the transplanter.

3. The apparatus of claim 1, wherein the second direction is parallel to the frame.

4. The apparatus of claim 1, wherein the pick up means includes at least one actuator.

5. The apparatus of claim 1, wherein the conveyor assembly is nominally synchronized with the plant dropping means for ensuring the continuous feeding of said plant dropping means at the planting speed.

6. The apparatus of claim 1, wherein the conveyor assembly selectively modifies its speed in order to skip an empty receptacle and selectively re-establishes its nominal speed for ensuring the continuous feeding of the plant dropping means at the planting speed.

7. The apparatus of claim 1, wherein the plant dropping means includes a carousel, the conveyor assembly being synchronized with the angular position of the carousel for ensuring the continuous feeding of said carousel at the planting speed.

* * * * *